US012135816B2

(12) United States Patent
Falchuk et al.

(10) Patent No.: US 12,135,816 B2
(45) Date of Patent: Nov. 5, 2024

(54) SYSTEM AND METHOD TO PREVENT SURVEILLANCE AND PRESERVE PRIVACY IN VIRTUAL REALITY

(71) Applicant: InterDigital VC Holdings, Inc., Wilmington, DE (US)

(72) Inventors: Benjamin Falchuk, Upper Nyack, NY (US); Shoshana Loeb, Philadelphia, PA (US); Ralph Neff, San Diego, CA (US)

(73) Assignee: InterDigital VC Holdings, Inc., Wilmington, DE (US)

( * ) Notice: Subject to any disclaimer, the term of this patent is extended or adjusted under 35 U.S.C. 154(b) by 95 days.

(21) Appl. No.: 17/942,900

(22) Filed: Sep. 12, 2022

(65) Prior Publication Data
US 2023/0004676 A1    Jan. 5, 2023

Related U.S. Application Data

(63) Continuation of application No. 16/480,275, filed as application No. PCT/US2018/016308 on Jan. 31, 2018, now Pat. No. 11,443,059.
(Continued)

(51) Int. Cl.
*G06F 21/62* (2013.01)
*G06F 3/04815* (2022.01)
(Continued)

(52) U.S. Cl.
CPC ...... *G06F 21/6245* (2013.01); *G06F 3/04815* (2013.01); *G06T 19/00* (2013.01);
(Continued)

(58) Field of Classification Search
None
See application file for complete search history.

(56) References Cited

U.S. PATENT DOCUMENTS

| 8,694,901 B2 | 4/2014 | Falchuk |
| 9,088,889 B2 | 7/2015 | Loeb |

(Continued)

FOREIGN PATENT DOCUMENTS

| WO | 2013028813 A1 | 2/2013 |
| WO | 2015034970 A1 | 3/2015 |
| WO | 2016135450 A1 | 9/2016 |

OTHER PUBLICATIONS

International Search Report and Written Opinion of the International Searching Authority for PCT/US2018/016308 mailed on Mar. 26, 2018.
(Continued)

*Primary Examiner* — Saptarshi Mazumder
(74) *Attorney, Agent, or Firm* — Klintworth & Rozenblat IP LLP

(57) ABSTRACT

Preserving user privacy and preventing surveillance on behalf of users of a virtual reality world. One or more plans are available when a privacy or surveillance risk to a user is detected. In one plan, configurable scripts execute on behalf of the user to create a confusing array of clone avatars that obfuscate the real user avatar behavior. A malevolent avatar, attempting to surveil the user, may have difficulty distinguishing the clones from the user and may miss out on private insights he might otherwise have learned from the user's behavior. In another exemplary privacy plan, a copy of part of the virtual world is spawned, occupied exclusively by the user's avatar, and then merged into the main world. Privacy plans may be selected manually or automatically in response to perceived privacy threats to strike a balance between privacy and enjoyment within the virtual world.

18 Claims, 17 Drawing Sheets

Related U.S. Application Data

(60) Provisional application No. 62/455,971, filed on Feb. 7, 2017.

(51) Int. Cl.
    *G06F 3/05*     (2006.01)
    *G06T 19/00*     (2011.01)
    *H04L 9/40*     (2022.01)
    *H04W 12/02*     (2009.01)
    *H04W 12/033*     (2021.01)
    *H04W 12/67*     (2021.01)

(52) U.S. Cl.
CPC ......... *H04L 63/0421* (2013.01); *H04W 12/02* (2013.01); *H04W 12/033* (2021.01); *H04W 12/67* (2021.01); *G06T 2219/024* (2013.01)

(56) References Cited

U.S. PATENT DOCUMENTS

| | | | |
|---|---|---|---|
| 10,795,449 B2 * | 10/2020 | Faaborg | G06F 3/013 |
| 2006/0258462 A1 | 11/2006 | Cheng | |
| 2008/0133392 A1 | 6/2008 | Jung | |
| 2009/0199095 A1 | 8/2009 | Nicol, II | |
| 2009/0300525 A1 | 12/2009 | Jolliff | |
| 2009/0303984 A1 | 12/2009 | Clark | |
| 2009/0307611 A1 | 12/2009 | Riley | |
| 2010/0162149 A1 | 6/2010 | Sheleheda | |
| 2012/0233640 A1 | 9/2012 | Odryna | |
| 2016/0321470 A1 | 11/2016 | Singh | |
| 2017/0148267 A1 | 5/2017 | Parker | |
| 2018/0107835 A1 * | 4/2018 | Clement | A63F 13/212 |

OTHER PUBLICATIONS

Written Opinion of the International Preliminary Examining Authority for PCT/US2018/016308 mailed on Jan. 15, 2019, 6 pages.

International Preliminary Report on Patentability for PCT/US2018/016308 mailed Jun. 7, 2019, 11 pages.

Wikipedia, "Virtual Reality". Wikipedia web article, available at: https://en.wikipedia.org/w/index.php?title=Virtual_reality&oldid=763291121, modified on Feb. 2, 2017, 22 pages.

Jackson, C., et. al., "Protecting Browser State from Web Privacy Attacks". Proceedings of the 15th International Conference on World Wide Web, (ACM), May 2006, pp. 737-744.

Woollaston, V., "Virtual Reality Can Significantly Reduce Symptoms of Depression and Anxiety in Just a Month by Turning Sufferers into Avatars". Daily Mail UK, web article, available at: https://web.archive.org/web/20161223004104/http://www.dailymail.co.uk/sciencetech/article-3447686/Virtual-reality-help-treat-depression-anxiety-Avatars-headsets-make-patients-feel-positive.html, Feb. 15, 2016, 5 pages.

Mishna, F., et. al., "Cyber Bullying Behaviors Among Middle and High School Students". American Journal of Orthopsychiatry, vol. 80. No. 3, Jul. 2010, pp. 362-374.

Brooke, P., et. al., "User-Visible Cryptography in Email and Web Scenarios". Information & Computer Security, vol. 23, No. 1, (2015), pp. 58-72.

Cherbakov, L. et al, "Virtual Spaces: Enabling Immersive Collaborative Enterprise Part 1: Introduction to the Opportunities and Technologies". IBM, Developer Works, web article available at: https://web.archive.org/web/20161011093934/http://www.ibm.com/developerworks/library/ws-virtualspaces/, Jun. 30, 2009, pp. 1-18.

Newell, A., "A Textbook That Points the Way: Review of Nils Nilsson Principle of Artificial Intelligence". Springer, (1980), 4 pages.

Decker, K., et. al., "Modeling Information Agents: Advertisements, Organizational Roles, and Dynamic Behavior". Association for the Advancement of Artificial Intelligence Workshop on Agent Modeling (AAAI-96), (1996), pp. 9-16.

Wowpedia, "Stealth (in World of Warcraft)". Wowpedia Gamepedia, web article available at: https://wow.gamepedia.com/index.php?title=Stealth&oldid=436144, modified on Jan. 21, 2017, 3 pages.

Wikipedia, "Turing Test". Wikipedia web article, available at: https://en.wikipedia.org/w/index.php?title=Turing_test&oldid=762764045, modified on Jan. 30, 2017, 23 pages.

Van Dam, J.W., et. al., "Online Profiling and Clustering of Facebook Users". Elsevier Press, Decision Support Systems, vol. 70, (2015) pp. 60-72.

Wikipedia, "Software Agent". Wikipedia web article, available at: https://en.wikipedia.org/w/index.php?title=Software_agent&oldid=762246399, modified on Jan. 27, 2019, 7 pages.

Lundblad, N., "Privacy in a Noise Society". Stockholm Institute for Scandianvian Law, (2004), pp. 349-371.

Falchuk, B., et. al., "Privacy Enhancements for Mobile and Social Uses of Consumer Electronics". IEEE Communications Magazine, vol. 48, No. 6, (2010), pp. 102-108.

Falchuk, B., et. al., "Towards "Guardian Angels" and Improved Mobile User Experience". IEEE Global Telecommunications Conference (IEEE Globecom), (2008), pp. 1-5.

Falchuk, B., et. al., "Just-In-Time Reconnaissance and Assistance for Video Game Streams and Players". IEEE Consumer Communications and Networking Conference (CCNC), (2016), pp. 99-102.

Falchuk, Ben., et. al., "Skimming Video Action Using Annotated 3D Surfaces". Eurographics Association, Short Paper, (2011), pp. 49-52.

Johnston, Sean, "In Holograms: A Cultural History". 1st Edition, Oxford University Press, Section 11.1, Galaxies and holograms far, far away. Retrieved from https://books.google.com/books?id=gWG8CgAAQBAJ&printsec=frontcover, (2015), 1 page.

\* cited by examiner

| ARTIFACT ID | TYPE | NAME | DETAILS |
|---|---|---|---|
| BXGX23 | BEHAVIOR ENTITY | B123 | VIEW |
| ... | ... | ... | ... |
| ... | ... | ... | ... |

SYSTEM AND METHOD TO PREVENT SURVEILLANCE AND PRESERVE PRIVACY IN VIRTUAL REALITY

CROSS-REFERENCE TO RELATED APPLICATIONS

This application is a continuation of U.S. patent application Ser. No. 16/480,275, filed Jul. 23, 2019, which is a national stage application under 35 U.S.C. 371 of International Application No. PCT/US2018/016308, entitled SYSTEM AND METHOD TO PREVENT SURVEILLANCE AND PRESERVE PRIVACY IN VIRTUAL REALITY, filed on Jan. 31, 2018, which claims benefit under 35 U.S.C. § 119(e) from U.S. Provisional Patent Application Ser. No. 62/455,971, entitled SYSTEM AND METHOD TO PREVENT SURVEILLANCE AND PRESERVE PRIVACY IN VIRTUAL REALITY, filed Feb. 7, 2017. All of the foregoing disclosures are hereby incorporated by reference.

BACKGROUND

Virtual reality (VR) experiences, experienced through stereoscopic head-mounted displays (HMD) are now both technically and economically viable. VR is a computer technology that provides a simulation of an environment and of a user's presence and interactions within that environment. In a VR experience, a user may be represented by an avatar. An avatar is an active entity rendered within VR and helps provide the sensation of presence. In social VR, there is typically a 1-to-1 correspondence between human participants in the experience and avatars, although this is not necessary as avatars may be controlled by computer processes (in which case they are often referred to as "bots").

Many VR systems make use of either a computer monitor or a virtual reality headset (also called head-mounted display or HMD), and some such systems provide sound to the user through speakers or headphones. A VR experience can be realistic or can provide an experience that differs from reality. VR is a type of digital experience (DE) that is immersive, blocking-out perception of the real-world. A VR experience may take place in a virtual world (VW). A VW is a particularly designed VR experience. A common scenario is that at least one human-controlled avatar will experience the VW. In a social VW many human controlled avatars experience the VW simultaneously and communicate with one another.

Several new products (with consumer price points that are comparable to those of personal computers or less) are now on the market. Additional controllers, to be worn and/or held by VR participants are also commercially and technically viable. Developers are using software development kits and a variety of authoring tools to create individual, collaborative, social, and competitive immersive experiences. Several VR app-stores exist from which customers can purchase and download VR experiences. Content providers such as movie studios are developing new forms of immersive storytelling using VR technology based on their significant digital assets (such as the Star Wars universe).

In parallel to these developments, many users and government policy-makers believe there exist valid concerns about both Internet and data privacy. More specifically, some experts believe that Web user tracking, cookies, big data, application analytics, device fingerprinting, and other fields pose serious threats to users' ability to remain anonymous while using digital services. When privacy is compromised users may be more vulnerable to tracking, targeted advertisements, profiling, and identity theft. To most users—even the most tech-savvy—attacks on privacy are subtle and some may be unnoticeable until severe damage occurs.

Commercially available VR head-mounted displays (HMD) include: Samsung Gear VR, Oculus Rift, HTC Vive, and PlayStation VR. Google Cardboard is a budget HMD made mostly of cardboard, a chassis into which users can fit certain mobile phones. Controllers that are effective for VR uses include the Sony Move controller, the Vive controllers, and Leap Motion, among others.

As technology rapidly improves, the social VR genre will support vast spaces containing many avatars. Commercially available social VR experiences, in which groups of users meet virtually for the main purpose of communicating and interacting are available and include CONVRGE, AltSpaceVR, and vTime. Presently, less immersive 2D and 2.5D games such as The Sims and World of Warcraft allow thousands of players to interact in the same environment, simultaneously.

The above aspects and technology milestones relating to VR and the relatively rapid rate of hardware and software improvements means that it is likely that high fidelity VR experiences will be ubiquitous in the near future. It is also likely that human users will immerse themselves for longer and longer times in virtual worlds, confronted with vast numbers of other avatars, both human-controlled and bots.

Privacy in the physical world can be achieved by avoiding areas of mass surveillance such as public squares, grocery stores, and storefronts. Clothing and makeup can help people remain anonymous, as can masks—although for security reasons, some public places and events prohibit masks from being worn.

Some anonymity can be achieved while using mobile phones by using a pre-paid phone. A personal cellphone can be encrypted and locked with a passcode but call metadata is generally logged by the wireless carrier. Today's mobile apps are highly instrumented to send all sorts of data collected from the phone and the user-app interactions, including demographic data such as age, device type, etc. Users can evade this by avoiding apps that collect and convey analytic information, by using apps only in "airplane mode" (which may only be a temporary solution), by using throw-away user ID's and phones, and other tactics.

Anonymous web browsing can be achieved by anonymous no-logging virtual private network (VPN) services. It is debatable how effective these techniques are. Some websites honor Do-not-track flags that the user can enable on a web browser, thereby reducing the tracking that the site does. Web browsers can disable cookies altogether or use private browsing modes. Using encrypted connections for information sharing such Pretty Good Privacy or SSH tunneling can create a secure pipe between the web browser and the endpoint. Unfortunately, none of these techniques provides a guarantee of anonymity or privacy.

As a whole, there is a risk to user of being heavily surveilled and observed, even within virtual environments—potentially more so than in the real world. Some significant fraction of virtual worlds are highly social, involve many players (human and machine alike) and many communications, and will be open to free-form inter-player interactions. In addition to good behavior, there is also a risk of toxic, deceptive, and anti-social behaviors. Within VR worlds avatar behaviors might be annoying, threatening, or worse. Social media and video games have been used as means for stalking and bullying. Avatars may—in principle—be able to watch and surveil other avatars, gather information, and perform analytics on the surveillance data. The possibility and efficacy of such surveillance will be limited by the rules and capabilities of the particular VR platform/engine, API's, the sophistication of the logic controlling the avatar, and more.

In the real world, someone who secretly follows and watches a target stands to learn quite a bit about the target's day to day patterns, where he works and lives, where he shops, who he talks to, the gas and coffee he prefers, etc. Similarly, an avatar's behaviors within virtual reality could become liabilities when tracked. Behavior models and profiles created to describe a given avatar might not only be used for good but might be exploited by nefarious agents, for advertising, etc. For example, repetitive behaviors within virtual reality will be understood to be a normal routine, and can thus be exploited. Also, spatial-physical interaction behaviors within VR (anything from inquisitively looking around to certain gestures made while interacting) could, in principle, be aggregated into a model that reflects the mental state of the person controlling the avatar. For example, a mental state of agitation could be detected by observing multiple small, but irregular, movements or gestures, while shame might be detected by lack of interactions with the digital world.

In social VR, a world may be shared by tens, hundreds or maybe thousands of avatars (both human-controlled and bots). In these scenarios, users may be observed and surveilled by these avatars. In such scenarios, it can be difficult to determine whether an encountered avatar is a bot. For example, an advanced bot may be able to pass a simple version of a Turing test, but otherwise may appear to be human-controlled to a casual observer. A bot—not limited by the inbound bandwidth of the human perception system—is likely to be able to observe and surveil others systematically and efficiently. Even where it is possible to determine whether an avatar is human-controlled, it can be difficult to determine underlying motivations.

It is presently difficult to obtain sufficient privacy within a virtual reality experience (e.g. a Social VR experience), due to the possibility of observation or surveillance by human-controlled avatars and/or bots. The problem is likely to increase in severity as virtual worlds become larger, more pervasive, and more realistic. Current capabilities such as invisibility or teleportation do not properly satisfy these needs. There is a need for more advanced techniques and tools in order to preserve a user's privacy in a social VR experience.

SUMMARY

The present disclosure describes systems and methods to achieve increased privacy using a framework for privacy tools suitable for use in a virtual world (VW) in which many avatars may be observing the user at any time, such as social virtual reality. Multiple privacy plans are made available to the user, and such tools may be used singly or in useful combinations in order to increase the user's privacy. Embodiments described herein maintain a sufficient level of usability, for both the user creating the privacy, and other friendly users presently within the VW.

Disclosed embodiments may be particularly useful with a) large numbers of avatars, b) capabilities for moving, acting, and interacting very freely within the environment, and c) a wide user base drawn from beyond a single realm of one user's close social connections. In some embodiments, the system may provide a privacy plan as a means for a user within a VR to confuse observers with noise and deceptive data. In other embodiments, the system may enable the user to become invisible to other users for some period of time. In yet other embodiments, the system may allow a user to inhabit a private copy of at least a portion of the VW, so that the user may interact with the private copy unseen by others. In some embodiments, the system may provide a private or semi-private area of the VW which some or all other users are unable to enter and/or unable to observe. In some embodiments, the system may provide a user interface in which a privacy tool may be selected and configured for use, or in which multiple privacy tools may be selected for use in combination.

In some embodiments, the system provides a set of steps that incorporate graphical user interfaces (GUI's); these steps can be initiated by the user or by the system and result in the injection of extraneous and/or distracting information, the intent of which is to confuse other avatars (i.e., other users). In one embodiment, a user's avatar splits into multiple identical clones, each of which has a scripted behavior designed to confuse observers. Under the cover of this replication the user's actual avatar can either slip out of visual range of observers, or may perform more private/sensitive actions knowing that, even if an observer averages out the data-points of the user and clones, little of interest will be revealed. This, in turn, provides the user with at least a temporary period of increased privacy. Such means may be utilized from time to time, not necessarily on a continuous basis.

Exemplary embodiments may be used to offer a supplemental set of capabilities within VR so as to provide tools to prevent surveillance by other users, avatars and/or bots, and to preserve privacy of a VR user within immersive virtual worlds, such as social worlds, in which participants co-interact in high-fidelity and where users and bots can capture and observe activities within the VR in high-fidelity.

Further exemplary embodiments may provide e-commerce anonymization within VR, helping users increase anonymity of actions while shopping in immersive VR stores or malls. Such embodiments may, for example, operate to obscure the fact that the user goes to certain stores within a virtual mall or looks at certain products within a store. Some embodiments may have applications in the realm of immersive VR for medical therapies.

Some embodiments are employed in the context of 2D games, serious games, telepresence, video conferencing, or other applications. Embodiments may be used in immersive virtual worlds of varying types in which multiple avatars socialize, interact, and co-work. These types include but aren't limited to: social, competitive, serious gaming, and business environments.

The entities, connections, arrangements, and the like that are depicted in—and described in connection with—the various figures are presented by way of example and not by way of limitation. As such, any and all statements or other indications as to what a particular figure depicts, what a particular element or entity in a particular figure "is" or "has," and any and all similar statements—that may in isolation and out of context be read as absolute and therefore limiting—may only properly be read as being constructively preceded by a clause such as "In at least one embodiment, . . . "

DETAILED DESCRIPTION

Overview of Exemplary Embodiments

Figure 1:
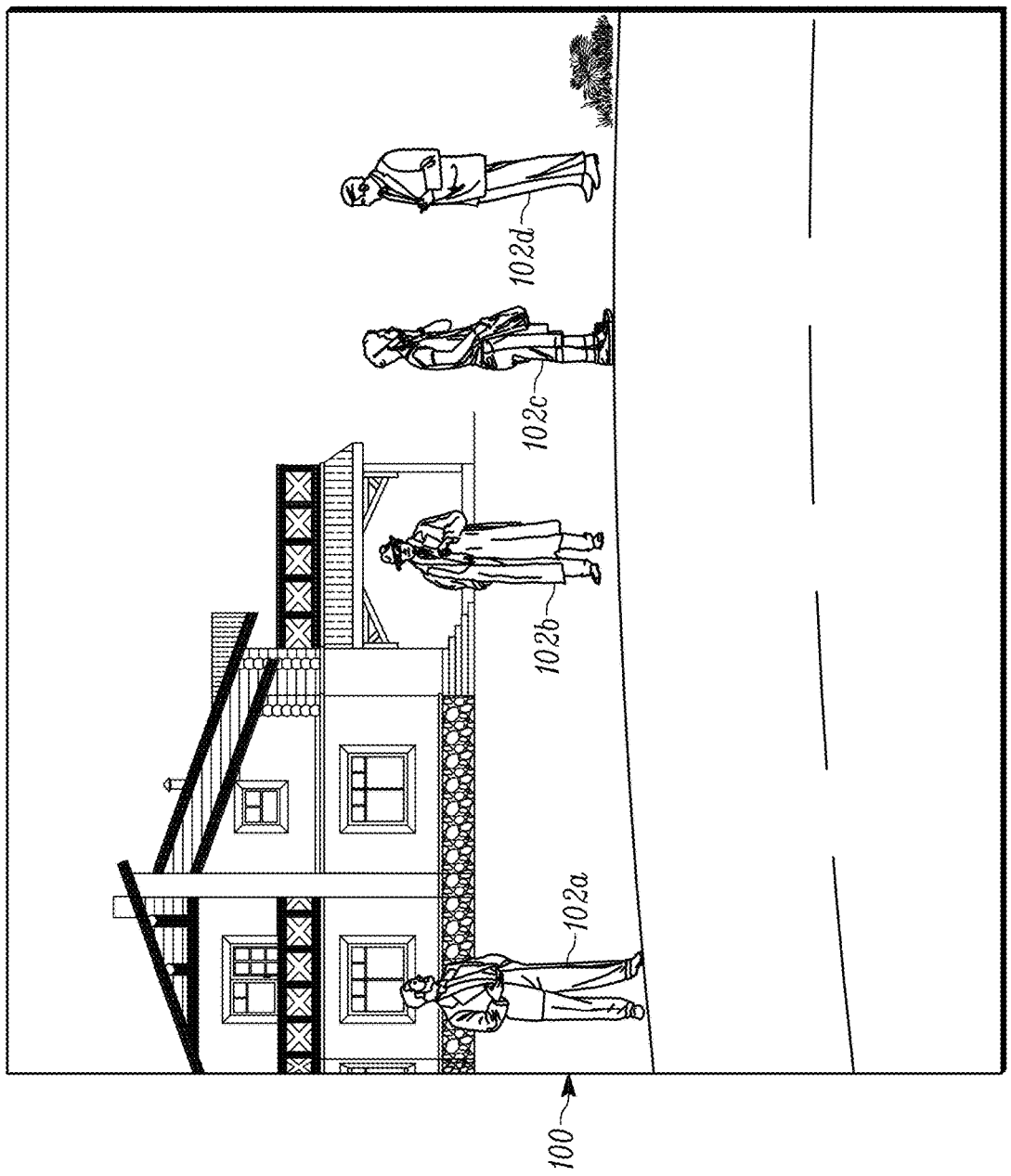
FIG. 1 is a view of a virtual world in a social virtual reality experience, including four avatars in a virtual environment.

FIG. 1 is a view 100 of a virtual world (VW) in a social virtual reality (VR) experience, including four avatars 102a-120d in a virtual environment. Unfortunately, highly open and free virtual worlds can also enable nefarious usage such as tracking, surveillance and harassment, whose effects may range from annoying to dangerous. The present disclosure provides various tools by which a VR user may preserve privacy and prevent such surveillance by others. In VR worlds, there is a risk of surveillance principally from two main types of entities. First is the fabric of the VR itself. The VR fabric or framework is the computing platform on which the VR runs. It is typically responsible for maintaining world state (e.g., positions of avatars) as well as rendering scenes on a screen buffer (or sending scenes towards a rendering pipeline). The fabric is essentially omniscient. It is not straightforward to evade surveillance by the fabric itself because the virtual existence depends on the logic and rendering engine of the fabric. Second are other avatars, such as avatars 102a-102d, both human-controlled avatars and software-controlled avatars known as bots. Human-controlled avatars, can generally know only what they perceive through their avatar (or what the fabric allows them to see through other means such as tools like maps, data, etc.). The current disclosure focuses primarily on techniques for avoiding and reducing surveillance by human- and software-controlled avatars.

Exemplary embodiments make use of privacy plans to increase the privacy of users. A privacy plan (which may be referred to hereinafter as a "Plan") may include one or more behavior modules (B1, . . . Bn) for concealing activities of the user, by concealing or confusing activities of an avatar of the user from other avatars. Each behavior module B has a role relative to the start of the Plan and to other behaviors (e.g., a sequence). Each module B has at least some action that is executed (e.g., a script in Unity or another programming language) to effect a change in the VR world (e.g., through an API). Each module B may also reference one or more VR entities or may instantiate new VR entities. In some embodiments, behaviors are modularized so that they are stand-alone components and can be linked together. A behavior has an implementation in a syntax that ultimately allows its execution in a manner compatible with the VW's fabric (e.g., as a Unity script, C # code, etc.). Where the implementation of a behavior uses coding logic, the behavior can check for conditions in the state of the world and, based on such conditions, it may terminate the Plan, extend the Plan, or do other things enabled by the syntax of the implementation. Behaviors and Plans may have metadata such as their name, category, ID, priority, sequence number, time deadlines, and other relevant information. Behaviors may have notions of time and place such as start times, end times (relative and absolute) and named places (if available within the VR world). Users may choose Plans by name, type or other category and Plans may be chosen, assembled, or edited via a user interface.

Figure 2:
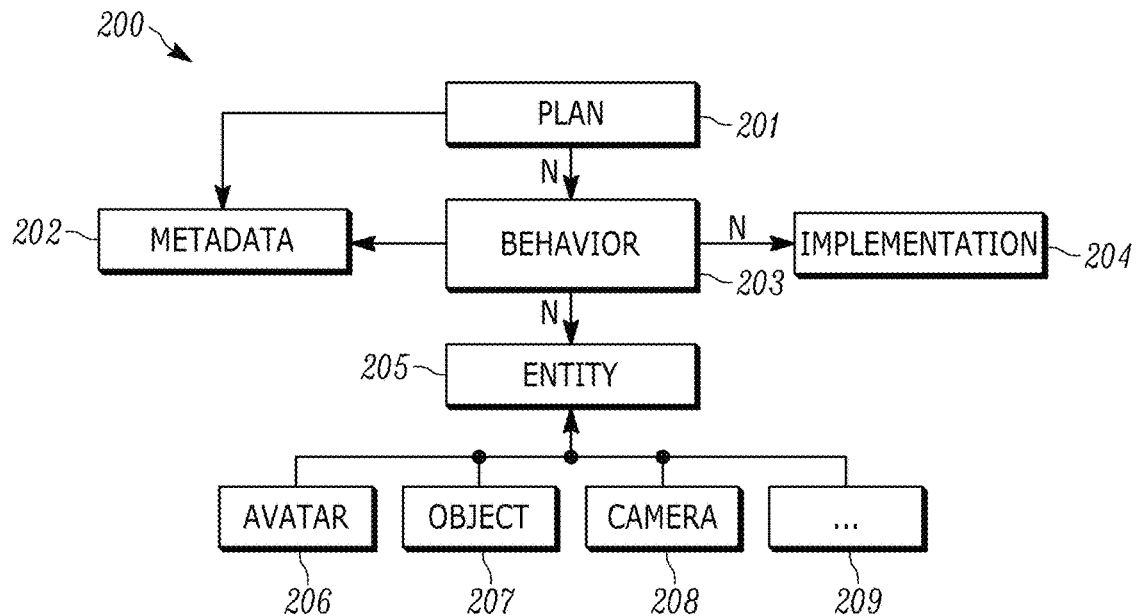
FIG. 2 is a block diagram illustrating an exemplary logical structure of a privacy plan used in some embodiments.

FIG. 2 is a block diagram illustrating an exemplary logical structure 200 of a Plan 201. Metadata 202 may contain data such as the Plan's name, category, ID, priority, sequence number, time deadlines, and other relevant information. Behavior modules (the machine readable aspects) may be stored in a searchable catalog or database 203. Certain behavior modules will have implementations using coding logic, stored in a catalog or database 204 and described by metadata 202. As illustrated in FIG. 2, a Plan is composed of 1 or more Behaviors 203. Each Behavior is described by metadata 202 and has an executable implementation component 204. The Behavior comprises arbitrary logic compatible with the VW API's that affects the virtual world. The Behavior may make reference to particular Avatar objects 2016 or other Objects 207 in the scene, the scene Camera 208, or anything else accessibly via API's. As an example, the effect of instantiating a given Behavior B might be the creation of a new Avatar object, of a new Chair object, and behavior logic that effectively makes the Avatar circle the chair 2 times and then have a seat in it. An entity has multiple options for manifestation, including an avatar 206, a generic object 207, a virtual camera 208 or camera view, and other possibilities in catalog 209.

Exemplary System Architecture.

Figure 3:
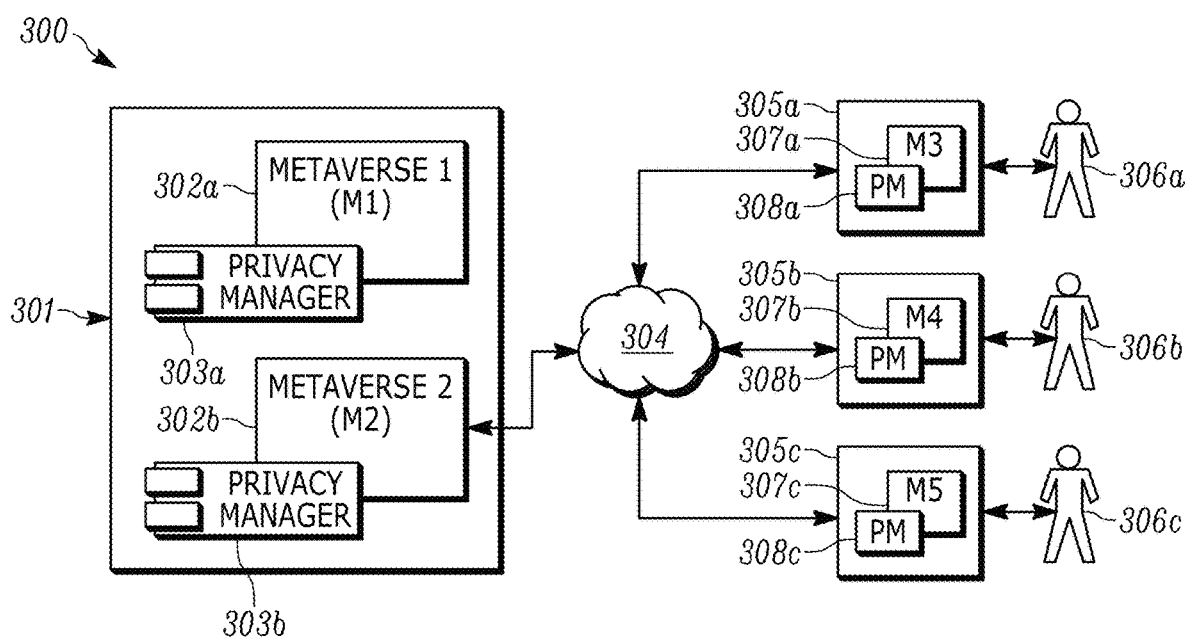
FIG. 3 is a block diagram of the architecture of an exemplary embodiment.

FIG. 3 is a block diagram of the architecture of an exemplary embodiment of a system architecture for a VR system 300 that operates to prevent surveillance and preserve privacy. VR system 300 includes a VR server 301 that runs two metaverse instances 302a (M1) and 302b (M2). As illustrated, each of the metaverse instances 302a (M1) and 302b (M2) has a privacy system. Assigned to each metaverse instance is a privacy manager, 303a and 303b, respectively. Exemplary privacy manager can be implemented as software, a method executed on a processor and stored in computer memory, which is a non-transitory computer-readable medium. In the case where VR server 301 is providing the fabric for VR across connected network 304, possibly the internet or a private intranet, it is possible that server 301 could host multiple virtual realities for user equipment 305a-305c. Users 306a-306c each operates their respective equipment, 305a-305c, either connected through network 304 to server 301 as illustrated, or disconnected from network 304 in an off-line mode. Although a single user is illustrated per user device, it should be understood that some or all of user equipment 305a-305c may support multiple users.

As illustrated, each of user equipment 305a-305c hosts a metaverse instance 307a-307c, denoted as M3-M5. Any of M3-M5 may be a common metaverse instance, for example, M4 and M5 (metaverse instances 307b and 307c) may share a common metaverse M2 (metaverse instance 302b), either fully or partially. That is, M4 may be a partial copy of M2, whereas M5 is a full copy of M2. Alternatively, a metaverse instance, for example M3 (metaverse instance 305a) may be a stand-alone instance, independent of any metaverse on server 301. As illustrated, each of metaverse instances 307a-307c (M3-M5) has its own privacy manager 308a-308c respectively. In some embodiments, privacy system components may operate together with the fabric computing engine of the virtual reality through an application program interface (API).

In alternative embodiments, a privacy system may be deployed on a third-party server (TPC) and offered as a service over the top of the VR world. In such embodiments, the TPC system may monitor and trigger privacy modes from its remote location to the VR world servers. The TPC may store privacy related preferences and may effectuate heuristics indicating how and when to trigger privacy. The TPC may interworks with the VR Server via network APIs. The user may be provided with the ability to connect directly to the TPC via the web to change preferences. In the case that clones are created to increase the user's privacy on the VR Server, in some embodiments, these clones may run on the TPC in a VR server spawned for just such an occasion.

Baseline Privacy Plans.

In some embodiments, a set of one or more baseline privacy plans is provided, with each privacy plan including one or more behaviors that conceal activities of the user. Plans may be used alone or in combination with other Plans, and may be extended. Baseline plans may include one or more of the following:

Eccentric Clones (EC), Instant Mannequin (IM), and Selective Disguise (SD) behaviors may be used to create temporary confusion for local observers and provide the user with a window of opportunity for privacy.

Privacy Lockout (PL), a behavior that when put into effect provides a space free from observation within the running VR world.

Private copy (PC), a behavior that when put into effect provides a fully private copy of a part of the VR world in which there are no unwanted observers.

Existing tools such as Teleport and Invisibility, or newly enhanced versions of these tools as described herein, which may for example be used in combination with the plans and behaviors listed above.

In exemplary embodiments, users may choose one or more Plans (e.g. to be used in combination) from a set of Plan options (e.g. preferably from a GUI presented within the VR experience). Embodiments disclosed herein enable VR users to choose, compose, and enact a new privacy plan—intended to prevent surveillance and/or to confuse observers—by specifying the information and/or configuration of a behavior. These actions may occur via a graphical user interface (GUI) or within the virtual experience.

In some embodiments, the VR fabric may be configured to perform primitive functions P1, P2, . . . Pn that can be used within behaviors to good effect, including but not limited to the functions identified in Table 1.

TABLE 1

Exemplary Primitive capabilities that support Privacy Plans

| Primitive | |
|---|---|
| P1 - Mesh and style functions | Relates to change shape (mesh), appearance (e.g., skin, face), or clothing |
| P2 - Visibility functions | Relates to change of avatar visibility to other avatars (and/or selectively) |
| P3 - Teleportation, movement function | Relates to instantaneously moving an object (e.g., avatar) from one distinct place in the VR world to another or make the object walk, run, or otherwise move from its current place towards a new place in the world. |

Exemplary baseline privacy options/modes are summarized in Table 2.

TABLE 2

Summary of Baseline Privacy Plans to Confuse Observers and/or Limit In-world Observation

| Name | Summary | Benefit |
|---|---|---|
| Eccentric Clones (EC) | Given startup, termination, and behavior configurations, the fabric creates a crowd of new avatar clones, each identical in appearance to the user's avatar, in such a way as observers may lose track of the user's avatar. Each clone follows a behavior intended to confuse observers and so to preserve the user's privacy. After some later time the clones may be terminated. | The real user has anonymity amongst the clones as the observer cannot pick her out from the crowd. The user can interact with other avatars as normal. Under statistical surveillance the average behavior of the crowd (incl. the user) is likely to be uninteresting. |
| Instant Mannequin (IM) | Given startup, termination, and behavior configurations, the fabric creates a single clone of the user in her place with a believable behavior, also the fabric may instantaneously teleport the user's avatar to a new place. | The real user enjoys privacy in the new place while the observer believes that the user has not changed positions at all. |
| Privacy Lockout (PL) | Allows a portion of the VR world to be used privately; other avatars/users may be temporarily locked out, removed, or prohibited from entering the area. For example, a room in a building may be subject to lockout so that the user may have private use of it for a period of time. When the Lockout expires or the user | Lockout function may provide the user privacy in a limited space for a period of time, so that the user may not be observed or disturbed by other users or bots. |

TABLE 2-continued

Summary of Baseline Privacy Plans to Confuse Observers and/or Limit In-world Observation

| Name | Summary | Benefit |
|---|---|---|
| | is finished using the locked out portion of the world, then the restriction is lifted and other users may again enter the area and interact with this portion of the VR world. | |
| Private Copy (PC) | Allows at least a portion of the VR world to be spawned as a Private Copy which the user may inhabit and interact with. The corresponding portion of the VR world in the main fabric continues to exist, and other users/avatars may continue to use it unaffected by the actions of the user in his/her Private Copy. When the user is done using the Private Copy, it may either be discarded, or (if the user wishes) any alterations or modifications made to the Private Copy may be merged into the corresponding portion of the main VR world. | Interactions and modifications made by the user may be discarded if not valuable, or preserved (merged) to the extent possible as determined by a merge algorithm. |
| Selective Disguise (SD) | Allows the avatar to stay in the local area but in a new (e.g. disguised) form. Observers do not easily notice the transformation so they are confused by the change and unsure about the avatar's new identity. | The real user enjoys continuous use of the local area while the observer is now confused. |
| Teleport | The user's avatar may be transported (e.g. instantly) to a new location in the virtual world. The destination may be selected by the user, e.g. from a list of destinations or by using a map interface. | Avatars and/or bots in the initial location may lose track of the user, so any surveillance by such entities is effectively interrupted. If another Plan is engaged at the same time (e.g. EC or SD), then any avatars and/or bots at the destination location will not be able to associate the user to the arriving teleported form since such entities will have no continuity to 'past observations' of the user. |
| Invisibility | The user's avatar may take an invisible form so that avatars and/or bots may not detect the presence or actions of the user. | Avatars and/or bots may not surveil the user while invisibility is engaged. If another plan is engaged at the same time (e.g. IM or EC) then such observing entities may not even realize that the user has become invisible. |

Once a plan option is chosen, it is subsequently put into effect which, in turn, may involve requesting that the fabric respond in certain ways including (but not limited to) using the primitive functions, adjusting or altering the VR world (e.g. via API calls), modifying the position and/or form of the user's avatar or other objects in the VR world, instantiating new objects, and so on. The plan may terminate based on timing information specified in the behaviors, or at the user's request, or may be pre-empted by the fabric.

Eccentric Clones Plans (EC).

Exemplary embodiments include a method for implementing an eccentric clones (EC) baseline plan. As noted above, in response to engagement of an eccentric clone baseline plan, the fabric may create one or multiple avatars, which have the same or similar appearance to that of the user's avatar. The clones may move about autonomously, so that observers (e.g. other avatars and/or bots) may become confused and may not be able to tell which avatar is under the control of the actual human user.

In some embodiments, the clones created by the fabric may be a form of a software agent. That is, to observers, these clones may exhibit a degree of some or all of: autonomy, persistence, social ability, and reactivity. In some embodiments, a behavior is tagged with a human-readable name corresponding to its intent. A clone assigned this behavior may also be referred to by this tag. For example, a clone may be referred to as a "window-shopper" if its behavior module compels it to tend to walk to the nearest store and look at products before leaving and returning home. The underlying nature of behaviors may be declarative (goal-based) or reactive. An agent may use back-chaining to compute the actions it should take in order to achieve the provided goal state of the behavior. There may also be a random element to clone behavior. In some embodiments, default randomized behavior may be assigned to any clone not otherwise receiving a specific assignment. In various embodiments, assigning a behavior to a newly-created clone may be approached by one or more of the following methods:

In one method, a series of declarative and adaptive behaviors are added to a database and indexed in such a way as to be searchable by one or more of: name, level of randomness, degree to which there is physical motion in the behavior, degree of interaction in the behavior, etc.

In another method, when clones are initiated (or perhaps in some advance configuration step which takes place before the clones are initiated) the user may specify which behaviors are preferred for which subset in statements such as: a) "assign all clones a behavior that has high randomness and high interaction levels", b) "assign half of the clones the behavior named 'walk around a house' and the other half of the clones the behavior named 'walk in circles'". Named behaviors may have additional characteristics not drawn out in the name (e.g., the circles to be traced out might be 10 meters in diameter and/or might have a specific object like a house at its center). Various clone behaviors may be selected from a list of available behaviors, and some clone behaviors may be tuned using parameters (e.g. 'clone motion' or 'clone-object interaction level', which may be set on a numerical scale such as 1 to 100 with higher numbers expressing a higher propensity of the clone to move about in the world, or a higher propensity for the clone to interact with objects in the world, etc.)

Clones may be assigned one or more behaviors that match the intent of the assignor. To this end, tuning parameters such as the ones above may be provided such that the parameters are set relative to the comparable parameter of the actual human user as observed or as historically recorded by the system. For example, a parameter such as 'clone motion' may be set on a scale of negative ten to positive ten, where negative values represent less propensity to move than the actual user of which the clone is a copy, zero represents the same propensity to move as the actual user, and positive values represent a higher propensity to move relative to the actual user. A similar relative scale may be provided for other parameters which may be used to tune the behavior of the clones or a subset of the clones.

While the clones are operating, the user can elude observation by blending into the crowd of clones, acting in a way indistinguishable to the clones, etc. During this time, the user can also perform actions that will be harder to observe by VR observers. Furthermore, if there are observers surveilling the user then they are likely to have to assume that any of the clones could be the real user. Attempts at observing and surveillance of these avatars by collecting data events will be less effective than before the appearance of the clones since the observer would be deluged with unimportant, evasive data-points that, when averaged, do not reveal interesting information about the user.

The clone scenario may conclude in response to the last clone finishing its task, in response to a predetermined time period (e.g. a time period set by the user at a clone configuration stage), or in response to the user choosing an option to terminate the EC mode on a user interface. After the conclusion of the clone scenario, no clones are rendered in the DE, only the user's avatar.

Figure 4A:
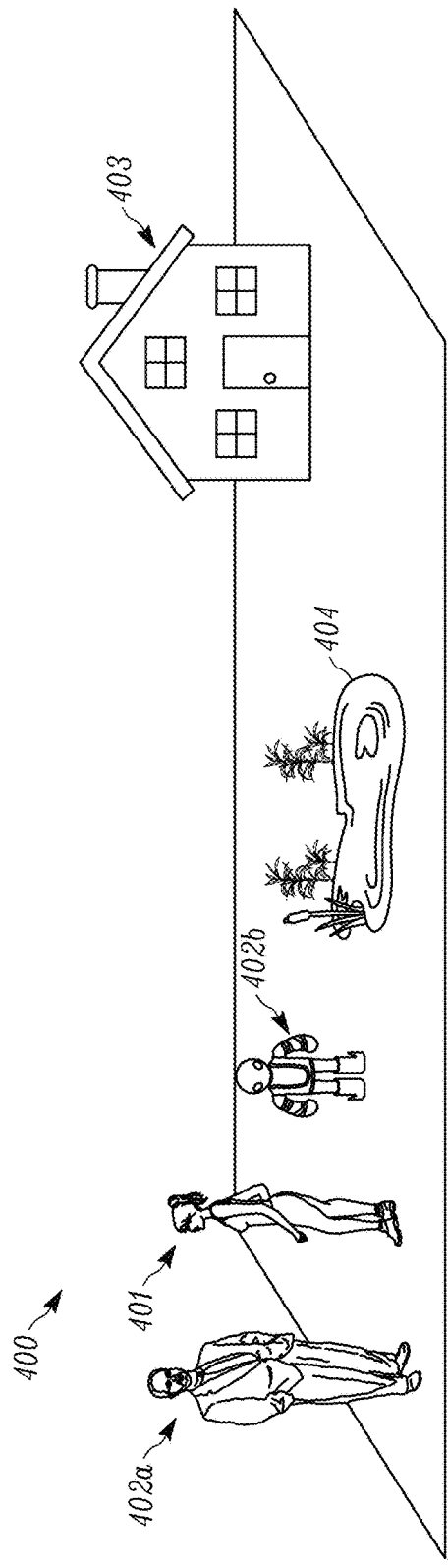
FIGS. 4A-4C illustrate an eccentric clone method performed in some embodiments.
Figure 4B:
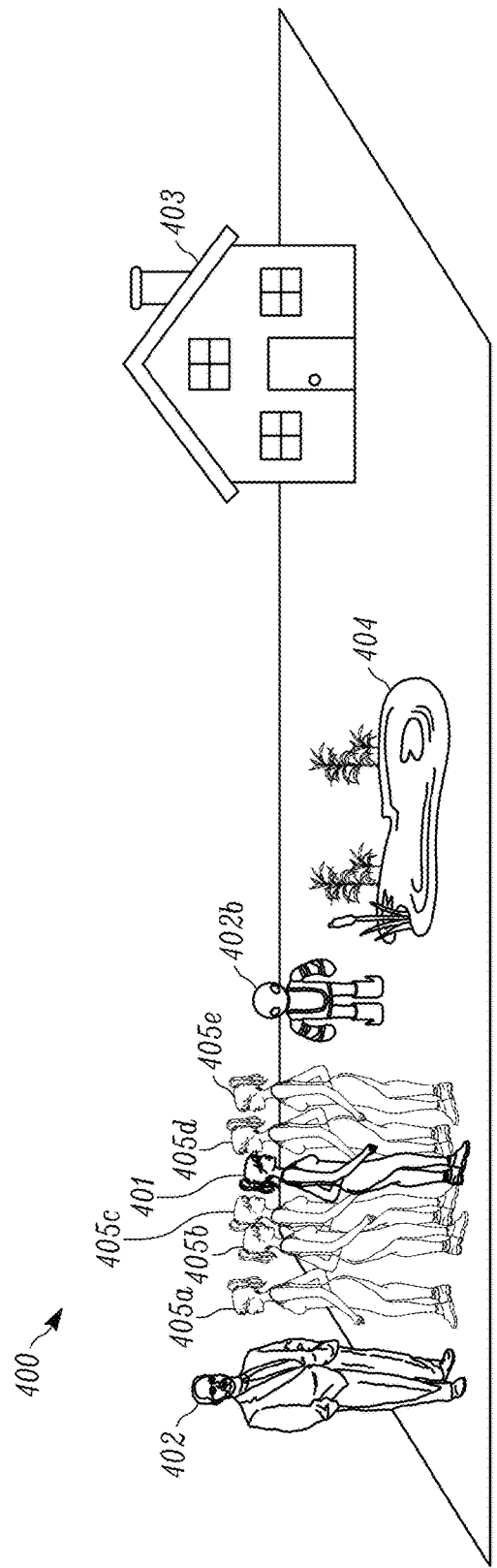
Figure 4C:
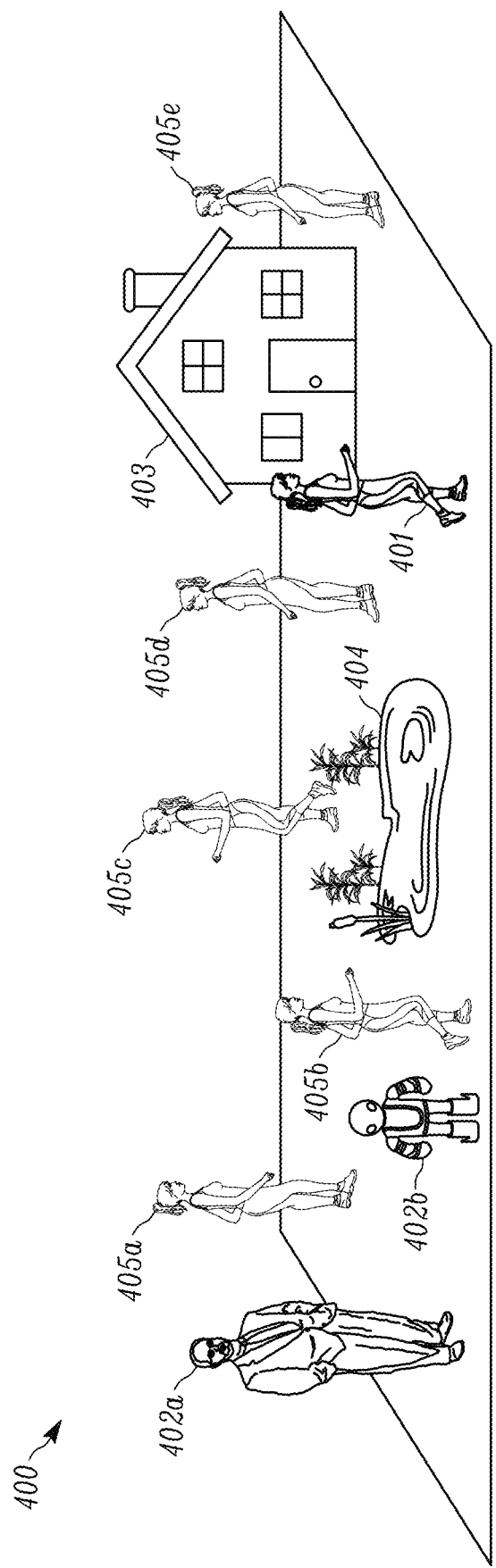

FIGS. 4A-4C illustrate an eccentric clone method performed in some embodiments. FIG. 4A shows a VW view 400 containing a human-controlled avatar 401 and other avatars 402a and 402b. It is unknown whether other avatars 402a and 402b are also human-controlled or else may be script-controlled bots. VW view 400 also shows two locations, a house 403 and a pond 404. Avatars 401, 402a, and 402b may move around within the VW, including visiting house 403 and pond 404. In the scenario depicted in FIGS. 4A-4C, the human user of avatar 401 wishes to have more privacy by limiting or preventing observation and possible analytics from agents controlling nearby avatars 402a and 402b. Knowing (or fearful) that her avatar 4014 may be under observation, the user triggers an eccentric clone method. The user may set parameters for the eccentric clone method at this time, or such parameters may have been set in advance. The parameters may indicate, for example, that five clones are to be generated. The parameters may also identify behaviors (or corresponding scripts) to be performed by those clones.

As illustrated in FIG. 4B, five clones of avatar 401 (identified as clone avatars 405a-405e) are spawned at substantially the same location as avatar 401 itself. The clones may be spawned by the fabric, according to UI selections and/or clone configuration settings provided by the user. The clones 405a-405e obfuscate the location of the human-controlled avatar 401 in the VW. Avatar 401 and clones 405a-405e may begin to carry out behaviors, with avatar 401 being controlled by the user and clones 405a-405e being controlled by one or more scripts. As an example, B and B2 may head towards the lake L, while the remaining clones may move toward the house H and slowly circle it.

As illustrated in FIG. 4C, avatar 401 and clones 405a-405e begin to separate. Unable to identify which of avatar 401 and clones 405a-405e is operated by a real human, avatar 402a remains nearby clone 405a and avatar 402b remains near clone 405b, enabling avatar 401 to escape, unnoticed. As illustrated, clone 405c visits pond 404 and clones 405d and 405e are nearby house 403. At any time the user can swap to embody any of clones 405a-405e. For example, the user can swap from controlling avatar 401 to controlling avatar 405e, with avatar 401 optionally either disappearing or being taken over by a script.

Figure 5:
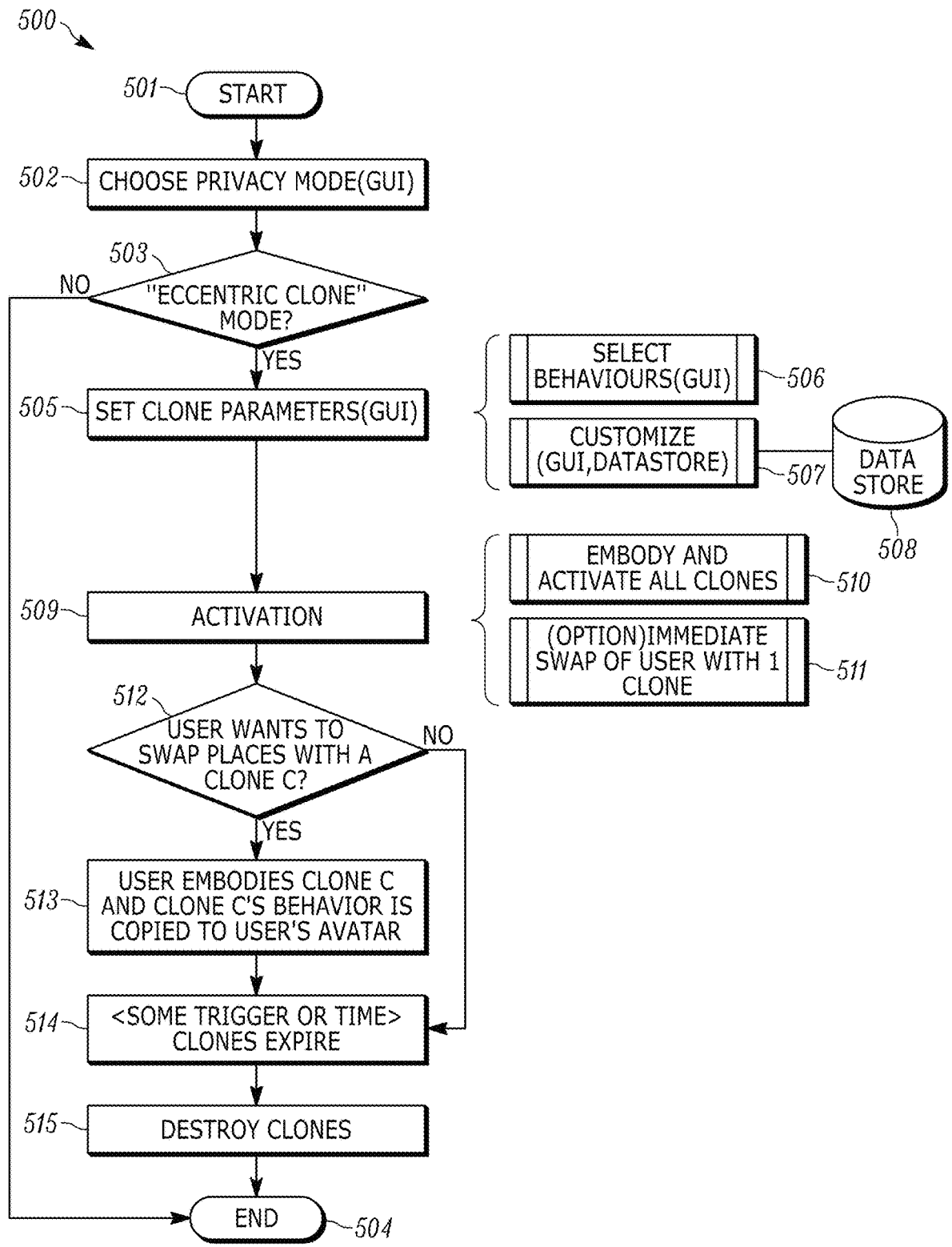
FIG. 5 is a flow chart illustrating an exemplary method using eccentric clones.

FIG. 5 is a flow chart illustrating an exemplary method 500 using eccentric clones, for example in the scenario depicted in FIGS. 4A-4C. Method 500 for eccentric clone execution and termination may be performed as follows, starting in box 501. A user is presented an option to choose a privacy mode, possibly through a GUI, in box 502, and the user's choice is ascertained in box 503. If the choice is not "EccentricClone" then this method terminates in box 504, and another privacy option method is employed. If an eccentric clone is indicated, then clone parameters are set in box 505. These may include behavior section (via a GUI), in box 506, and customization, in box 507. Customizations may be handled through a GUI, and may draw option information by accessing a data store 508. After parameters are set, the clone may be activated in box 509, to carry out the prescribed behaviors. This portion of method 500 may be implemented for each of a set of multiple clones.

Options associated with box 509 include embodying and activating all clones, as shown in box 510, and displaying the now-possible option for a user to swap from a primary avatar to one of the clones, in box 511. Thus, at some time while a clone is active, the user may choose to embody one of the clones, as described above for the scenario of FIGS. 4A-4c. A GUI enables the user to select a specific clone from among the various available clones. For example, the GUI may provide a digested list of available clones, or the user may be able to select the clone's avatar directly in the VW. The GUI may provide a display of the clone's metadata such as (but not limited to) the clone's task, location, time period etc. The user chooses a particular clone C, as noted in box 512, and a confirmation button may appear allowing this clone to be chosen. If confirmed by the user, control is switched so that the user embodies the chosen clone (Clone C) in box 513. As a result, the user perceives the VR through the body of the clone C, as well as having control of the avatar of clone C. Optionally the avatar that the user previously controlled (e.g. the user's original avatar, or a different clone the user previously selected to embody) may be deleted, may be made invisible, or may revert to an autonomous clone form. In the latter case, the avatar may be tasked with the (e.g. previous) task of Clone C. The latter variation comprises a teleportation, or avatar swap.

If the user does not timely confirm the choice, the swap option is terminated, and eventually the clones expire in box 514. This can occur because of affirmative deletion, either a subset or all clones, or the expiry of a timer. Clones are then destroyed in box 515, ending method 500 in box 504.

In some exemplary embodiments, clones are used that resemble the user's avatar. This may be used as the default approach. Some VR systems allow users to customize their avatars. This means that what is referred to as the "user's avatar" may be a rendition that may change over time in both appearance and capability, depending on the particular VR system implementation. Furthermore, the rendition of clones need not necessarily resemble exactly the user's avatar, though it is likely that by closely resembling the user's avatar that a maximum amount of confusion will be created in some situations.

In alternative embodiments, Clones may visually vary randomly from each other (e.g., all wearing different colored virtual shirts). Clones may alternatively appear as environmental elements (e.g., not human forms) that obscure the user, such as in human-sized clouds through which very little could be observed.

Exemplary steps for initiation of a clone-based privacy mode or tool may be tailored from method 500 and proceed as follows.
1. The user makes a determination to improve privacy via a confusion option.
2. A graphical user interface (GUI) is provided to the user, from which the privacy method is chosen and optionally a degree of privacy (e.g., low, medium, high) may be chosen. Optionally the user may be shown the computational impact (e.g., cost) of each method or configuration option. The user chooses parameters of the method from the GUI including one or more of the following:
   a. The number N of clones to spawn. In some embodiments, the user may also select the clones' physical arrangement in the VW. As an example, N clones might appear in a random crowd centered around the user's avatar up to a distance (e.g. 5 meters) from the user's avatar.
   b. Optionally the appearance of the clones (how other in-game avatars perceive the clone) may be configured. A default selection may be that each clone would appear substantially the same as the user's avatar.
   c. Optionally the degree of eccentricity of each clone, e.g. how much the clone differs in a given aspect from the observed user behavior with regards to that aspect, may be set.
   d. Optionally a behavior may be set to use for some or all of the clones (e.g. from a library of tasks or behaviors) For example, "walk in slow circles around the house" or "show an interest in trees and butterflies" may be chosen from a list of available clone tasks/behaviors.
   e. Optionally a time frame may be set after which the EC method will terminate.
   f. Optionally the user may choose an option to immediately embody one of the new clones or to remain in her current avatar. In the former case the user's perspective on the VR would immediately shift to reflect embodiment of the chosen clone.
3. The user chooses the method and related settings/configuration as described above, and selects an option to enact it.
4. The system checks if the VR framework is prepared to accept the EC privacy method as configured by the user, and if so it initiates the EC method. If not, it resets or fails with a message to the user.
5. The set of N clones is created and each begins to execute its prescribed behavior.

Instant Mannequin Plan (IM).

Exemplary embodiments include a method for implementing a mannequin-based privacy option. When mannequin mode is used, the user may temporarily relinquish control of the user's avatar, which may then be automatically controlled by the system in a way that casual observers (e.g. other users or bots) may not realize that the mannequin avatar is no longer controlled by the user. For example, the system may show the user's avatar resting, or sleeping, or performing simple interactions with the VW (e.g. walking, smelling virtual flowers, taking virtual pictures with a virtual camera, waving to other avatars, etc.). The system may record historical observations and/or properties of the user's behavior when the user is controlling the avatar, and may then use these observations and/or properties to drive the control of the mannequin avatar. For example, the system may collect statistics on how the user moves the avatar, how often the user performs certain actions or interactions, what objects the user tends to hold or use, what locations the user tends to visit, etc., and then the system may control the mannequin avatar in a way which produces similar statistics and/or similar actions. In this way, the mannequin avatar may be made to behave more like the human user, and other users or bots may therefore not notice that the avatar is being controlled by the system in mannequin mode.

The user may invoke mannequin mode from a user interface element (e.g. user may select this mode from among multiple privacy options/tools presented in a UI menu or list). In response to invocation of mannequin mode, the user may take on an alternate form so that the user may continue to explore or interact with the VW, perhaps unnoticed by other users or bots, which will be left to observe the user's original avatar which is then in mannequin form. The alternate form may utilize one or more of the other privacy modes described herein. For example, mannequin mode may be initiated, the system may assume control of the user's original avatar, and the user may be put into an alternate invisible form so that the user may continue to explore and/or interact with the VW (invisibly) while other users and bots are left to observe the system-controlled mannequin avatar. As another example, mannequin mode may be initiated, the VR system server may assume automated control of the user's original avatar, and the user may be put into an alternate disguised form which other users and bots may not recognize. Thus the user may temporarily relinquish control of the avatar to automated control, to interact with the VW in the alternate disguised form, while other users and bots are left to observe the system-controlled mannequin avatar. As yet another example, mannequin mode may be initiated, the system may assume control of the user's original avatar, and the user may take on an alternate form which is teleported to a new location (e.g. a location specified by the user). The alternate form may utilize another privacy mode (e.g. it may be invisible or disguised) so that the alternate form which appears in the new location may not be identifiable as the user. In this way, mannequin mode may be used together with one or multiple of the other privacy options/tools in order to preserve the user's privacy.

The user may invoke mannequin mode from a user interface (e.g. a menu or list of privacy options/tools). The user may select additional tools to be used together with mannequin mode, as described above. In some embodiments, the system may detect a location, a historical scenario, or a situation which may require privacy, and in this case the system may in response present a user interface which offers or prompts the user to enter the mannequin mode. In other embodiments, the system may detect a location, a historical scenario, or a situation which may require privacy, and in response the system may automatically invoke mannequin mode and/or another privacy mode in order to preserve the user's privacy. Mannequin mode may be invoked for a set time period (e.g. a time period set by the user), may be invoked until one or more criteria are satisfied, or may be invoked until the user turns off the mannequin mode (e.g. via a UI element). Upon exiting mannequin mode, control of the user's original avatar may be restored to the user, and the alternate avatar form may be discontinued.

Selective Disguise Plan (SD).

In an exemplary embodiment, the system may provide a disguise privacy option tool. Disguise may cause the user's avatar to appear in a different form than the user's original avatar. Various characteristics of the avatar may be altered to form the disguise. For example, hair length, hair style, hair color, facial hair, height, weight, gender, and clothing may be altered. A user whose original avatar takes the form of a short woman with dark hair may invoke the disguise mode in order to take on the form of an avatar which appears as a tall man with gray hair. Users and bots familiar with the appearance of the user's original (or typical) avatar may not be able to identify the user from the disguised avatar form. Disguise mode may be used in combination with other privacy options/tools (e.g. Teleport) so that users or bots may not directly observe the transformation from original avatar form to the disguised form. Uses of multiple privacy plans in combination may provide synergistic effects to improve privacy together better than the sum of the individual plans. For example, teleporting into a disguised avatar or teleporting into an invisible one may have a synergistic effect, and so may often be used together. Disguising an invisible avatar, however, may not always offer significant advantages over invisibility alone.

Disguise transformations are preferably not observable to other avatars or observers. Otherwise those transformations may not provide the desired level of privacy from an observer who is targeting the avatar and who has the user's avatar in continuous view. Thus, one embodiment of a Selective Disguise plan may transition to the disguised form using the following steps:

1. The system checks whether the surroundings support the ability to blend in nearby, such as the nearby presence of a crowd of avatars or other shelter such as tall grass. If no such cover exists, the system may not continue with the transformation plan.
2. The avatar disappears momentarily from the view of the observers and one or more calls to a private mesh/transform may be made so as to disguise the avatar.
3. The avatar reappears nearby amidst the cover in such a way as observers are unlikely to see the avatar reappear. For example, the fabric may place the user's newly disguised avatar in the center of a crowd, or in a location shielded from view (e.g. by the tall grass or other cover) and which is not currently visible from the vantage point of any other avatars or bots.
4. The user may continue to do what the user was doing in the local area, with little or no interruption. Any observers are likely confused.

The appearance of the disguised form may be configured in various ways depending on the embodiment. In some embodiments, the user may invoke disguised form and in response the system may randomly generate the various appearance characteristics for the disguised avatar. In this case, the disguised avatar may take on a different random appearance each time the disguised form is used. In another embodiment, the user may configure the disguised form in advance using an avatar editing user interface. The avatar editing user interface may allow the user to select various physical characteristics (height, weight, gender, hair, clothing, ethnicity, etc.) in order to design the appearance of the disguised avatar. The editing user interface may, for example, be the same user interface which is used to design original avatars for users. Once a user designs the disguised form of the avatar, the characteristics may be saved to a profile so the same disguised appearance may be used when the user invokes the disguise privacy option tool. A user may create and save multiple disguised avatar forms, in which case the user may select from among these at the time that the disguise privacy option is invoked.

As one example, the system may display a list of privacy options, and the user may select both 'Teleport' and 'Disguise' from the list. The system may display a map of the VW and allow the user to select a destination for the teleport. The system may then display a list of disguise avatar forms previously created/saved by the user, along with an additional 'random appearance' option. The user may select either a previously created disguise, or may select to take on a randomized appearance. When selections are finalized, the system may teleport the user to the new location, where the user's avatar will appear in the selected disguised form.

When in disguised form, the system may display metadata (e.g. user name, user characteristics) intentionally altered to preserve the disguise. For example, a user whose name is Alice may be identified for other users as Alice when using her original avatar form, but the displayed name may be changed to a different name (e.g. *Bella*) when disguised mode is engaged. A disguised name may be generated randomly, or it may be chosen by the user (e.g. a name for a disguised avatar may be entered by the user when the user edits and saves disguised avatar form for later use).

Privacy Lockout Plan (PL).

In a further exemplary embodiment, the system may provide a Lockout privacy tool option. A Privacy Lockout Plan may allow the user to select or define a location or area of the VW in which the user has exclusive access for a period of time. Other users or bots may not be able to enter the locked out location or area in order to observe the user. In some embodiments, other users or bots may not be able to see into the locked out location or area from the outside. For example, a virtual privacy fence may appear around the boundary of the locked out area, and this fence may prevent entry and/or viewing of the area by other users or bots. As another example, a virtual building selected as the lockout area may have locked doors and opaque windows during the lockout period, so that outside users and bots may not enter the virtual building and may not observe its occupants from the outside.

Selection of the area for lockout may be done via a user interface element. In a first embodiment, the system may present a lockout plan (e.g. in a list or menu of privacy options/tools) and upon selection of the lockout plan a circular area surrounding the user at a given distance may be selected automatically as the lockout area. The distance may be selected by the system so that it is large enough to provide space for interaction of the user, yet small enough so that the lockout area does not include the current location of any other users or bots. In a second embodiment, the user may select the lockout Plan (e.g. from a menu or list) and in response the system may present a map of the VR world (or a local subset of the VR world). The user may then select or indicate the area for lockout on the map. The system may restrict the selection of the location to prevent the user from defining a lockout area that would include other users or bots. In a third embodiment, the user may select the lockout plan (e.g. from a menu or list) and in response the system may present a list of places in the VW which are currently available for lockout privacy. For example, the system may determine rooms, stores, buildings, or other areas where no other users or bots currently reside, and may compile a list of such locations. The user may select a location, and may then be teleported there such that the lockout option is applied to the location upon the user's arrival.

The lockout plan may in some cases be invoked for a group of users. The group may be selected by a current user (e.g. selected from that user's 'friends list'), or the group may be multiple users who are currently sharing a session or a VR experience. A user may select a group lockout plan and may, if necessary, specify the other users to include in the group lockout. The lockout area may be then formed so that the users in the group have access to the area and can see and interact with the other group members within the lockout area, but where other users and bots which are not part of the group cannot enter and/or cannot see into the lockout area. In this way, the lockout plan may be used to provide privacy for a group of users.

A group lockout may be combined with the teleport option such that all group members may be teleported to the lockout area at the time the lockout option is invoked. For example, a user may select both Teleport and Group Lockout behaviors from a menu or list of privacy options/tools, may select the group users (if a group has not been defined previously, e.g. for a shared VR session), and may select the area or location for the group lockout. When all parameters are entered, the system may teleport the various group users to the group lockout location and may initiate the lockout so that the group users may interact with each other and with the lockout area unobserved by other users or bots.

The lockout may be terminated at the end of a selected period of time, upon satisfaction of a defined termination criterion, or upon the user turning off the lockout mode (e.g. via a user interface element). After the lockout is terminated, other users and/or bots may again be able to enter the previously locked out location, and may additionally regain the opportunity to observe the locked out location.

Private Copy Plan (PC).

In a further embodiment, the system may provide a Private Copy privacy tool option. A Private Copy Plan may allow the user to spawn a private copy of at least a portion of the VW, which may then be used privately for a time period. For example, the user may select Private Copy from a menu or list of available privacy options/tools. The system may allow the user to select the location and/or extent of the private copy (e.g. by specifying a location such as a building or store from a list of available locations, or by drawing a bounding box on a map which depicts the nearby area of the VR world). In response to the location for the private copy being specified, the system may create a private copy of the area and may allow the user to explore and interact with the private copy of the area. The private copy may be implemented in a server which presents the VR world to various user clients, or it may be implemented in the client device of the user which requested the private copy. While the private copy is in use, the original VW (including the same VW location or area on which the private copy is based) will continue to exist and run as before, and other users and bots may continue to interact with and observe anything within this part of the original VW. However, such other users and bots will not be able to observe the user of the Private Copy, nor will they see any interactions or alterations made by the user to the Private Copy. From the point of view of other users or bots in the VW, the user will have disappeared at the time the Private Copy mode was entered.

While inhabiting the private copy of the at least a portion of the VW, the user may explore and interact with objects and with the virtual environment without being observed by other users or bots. The user may alter the private copy through various interactions. For example, the user may move virtual objects, may purchase virtual items in a store, may hang a virtual picture or may paint a virtual wall. Because such actions are taken within the private copy, the associated alterations will not initially affect the main shared (public) copy of the VW. Indeed, the same portion of the original VW may in the same time period be altered in other ways, since other users may be interacting separately within the original VW.

The Private Copy mode may be terminated after a set time period, upon satisfaction of some termination criteria, or upon instruction by the user (e.g. selection of an Exit Private Copy function via a user interface). One example termination criterion is that the user may exit the boundaries of the private copy in order to terminate the private copy mode and return to the original (e.g. public) VW. For example, the user may be exploring the VW and may come upon a store which sells lingerie. The user may not want to be observed shopping for and selecting items from the store, so the user may select the Private Copy mode from a menu of privacy plans or behaviors, and may specify the store as the location on which to base the private copy. The system may create a private copy of the store in which the user may shop in privacy. When the user has selected and purchased lingerie items from the store, the user may exit the store to terminate the private copy of the store and to return to the main (public) copy of the larger VW.

Upon terminating the use of a private copy, the system may discard the private copy along with any modifications or alterations the user made to the objects and environment within the private copy. In this case, the memory and resources used to run the private copy are released, and the user's avatar is returned to the main VW, where it may again be visible to other users and bots. Although the Private Copy itself may be discarded, the effects of using the Private Copy may be preserved in the state of the user—for example, the user may retain objects which were picked up or purchased within the Private Copy area.

In another embodiment, the system may provide the option of merging into the main VW the modifications and alterations which the user made to the objects and environment within the Private Copy. If the user confirms that such modifications should be merged (e.g. that revealing such modifications to be observable by other users and bots is not a privacy concern to the user), then the system may run a merge algorithm in order to intelligently incorporate the changes from the Private Copy into the corresponding area of the main (public) VW. The merge algorithm may operate using any or all of the following principles.

1. If no other users occupied and/or observed the area of the main VW corresponding to the private copy during the time the private copy was in use, then the system may adopt all changes/alterations made by the user to the private copy.
2. If a user or users did occupy and/or observe the area of the main VW corresponding to the private copy during the time the private copy was in use, then the system may merge each change or alteration based on whether a conflicting change or alteration had been made in the main VW.
  3. If an individual change or alteration does not result in a conflict, then the change or alteration made by the user in the private copy may be adopted into the main VW during the merge. For example:
    a. If the user in the private copy painted a wall of a house red, and the same wall had not been painted or otherwise altered in the main VW while the private copy was being used, then the red wall may be adopted into the main VW at the time of the merge.
    b. If the user in the private copy moved an object from a table into a cabinet in the private copy, and the same object had not been moved in the main VW while the private copy was being used, then the object's new location in the cabinet may be adopted into the main VW at the time of the merge.
  4. In case of a detected conflict, changes or alterations made in the main VW may take precedence over changes made in the private copy. For example:
    a. If the user in the private copy painted a wall of the house red, and the same wall had been wallpapered by another user in the main VW while the private copy was being used, then after the merge the wall will remain wallpapered in the main VW.
    b. If the user in the private copy moved an object from a table into a cabinet in the private copy, and the same object had been picked up and pocketed by another user in the main VW while the private copy was being used, then after the merge the object would remain in the other user's pocket.
  5. In some embodiments, the system may time the merge alterations to minimize observation and resulting shock from other users which may inhabit the corresponding location in the main VW. For example, if the system determines that a wall in the main copy of the VW should be turned red as the result of a private copy merge, the system may monitor the location and wait until the wall is not being observed by other users (e.g. until the location is free of observers) and may then perform the merge action and cause the wall to turn red.

In some embodiments, a common private copy plan may be configured for a group of users. The group may be selected by a user (e.g. from a friends list), or it may be a group of users which is already defined for a shared session or a shared VR experience. The user interface to select and configure a private copy of at least a portion of the VW for private use by a group of users may take the same or similar form to the user interface previously defined for configuring a group lockout area.

In some embodiments, a private copy plan may be combined with other plans. For example, a user may select both Private Copy and Teleport plans from a list or menu of plans. The system may allow the user to select a location, area, or portion of the VW on which the private copy will be based. The selected location need not match or be near to the user's current location in the VW. The system may then spawn the private copy of the selected location or area, and may teleport the user (or a group of users) to the private copy which may then be used by the user or group exclusively without being observed by other users and/or bots.

Teleport Plan.

In some embodiments, the system provides a teleport privacy option/tool. A Teleport plan may transfer the user or the user's avatar (e.g. quickly or instantly) to a new location within the VW. The user may invoke Teleport via a user interface. For example, the user may select Teleport from a list of privacy options tools presented in a VR user interface. Upon user selection of Teleport, the system may display a second user interface element (e.g. a map of the VR world or a list of places in the VR world) in order to allow the user to select a remote destination for the teleport. In some embodiments, the system may allow the user to select a second privacy option tool to be applied immediately after the teleport. For example, the system may allow the user to teleport to a virtual bank within the VW, but appear there in a disguised form. As another example, the system may allow the user to teleport to a crowded bar in a seedy virtual neighborhood, but to appear invisible when emerging from the teleport. As a third example, the system may allow the user to teleport to a virtual store within the VR world, but to spawn a Private Copy of the store for the user's personal use. To this end, the user interface may allow the user to select the Teleport option tool, to specify a destination for the teleport, and to select a second privacy option tool to be applied upon teleportation. Once these are selected, the system may initiate the teleport.

In some embodiments, the system may support group teleportation. In this case, the user may select other users or avatars which should be teleported with the user as a group. For example, the group may be composed of other users who are on a friends list, or the group may be composed of other users with whom the user is currently having a shared session or a shared VR experience. One user may select the parameters for teleportation on behalf of the group, and the group may be teleported as a whole to a new location.

In response to a user or a group of users initiating a teleport, the user's avatar (and in the group case, the additional avatars of the other group members) will disappear from the current location. Any other users or bots which are observing these avatars will see the disappearance, but will not be able to detect the destination location.

Invisibility Plan.

In some embodiments, the system offers an Invisibility privacy plan. The Invisibility privacy plan may provide the user an ability to be invisible for a period of time. While invisibility mode is engaged, the user will not be seen by any users, and will not be observable by bots. Thus, the user may move within the VW without being identified or observed. The effects of the user's interaction may in some cases be observable, for example if an invisible user moves a virtual object or otherwise alters the environment, the movement of the object or the in-progress alteration may be visible. However, any user or bot observing such effects may not identify the invisible user as the source of the interaction.

A system may invoke invisibility at the request of the user. For example, the user may select Invisibility mode from a UI component (e.g. a menu or list of privacy tools/options). A user may select another UI component in order to turn invisibility off and become again visible to other users and bots. A user may be able to select to be invisible only to bots and to be visible to human users, in the case where the fabric is able to distinguish between human controlled avatars and bots. A user may be able to select to be visible to users who are on a list of users (e.g. a preferred list of users, a list of known users, or a list of friends), but to be invisible to other users not on the list. A user may be able to select to be visible only to a group of users selected by the user (e.g. a few users with whom the current user is sharing an experience). In the latter case, the current user may invoke invisibility on behalf of the group, and in response the system and/or the fabric may make all members of the group invisible to users outside the group, yet visible to users within the group. In this way a user may obtain focused privacy for a group of users who are sharing the VR experience.

In an exemplary embodiment, a user may invoke the Invisibility plan for a limited time, selected or defined by the user at the time invisibility is turned on. A user may invoke the Invisibility mode until a criterion is met, wherein the criterion may be selected or defined by the user. For example, the user may select to turn on Invisibility mode while the user is in a particular area of the VW (e.g. within a bank or a store, or within an area traced by the user on a map of the VR world). In this case, the system may turn off Invisibility automatically in response to the user exiting the location for which invisibility is selected, or in response to the user crossing the boundary which defines the particular area. In some embodiments, Invisibility mode for a user (or for a group) may be automatically offered or turned on by the system in response to the system detecting some criterion which suggests that privacy is needed.

For example, in response to a user (or a group of users sharing an experience) entering a location such as a virtual bank or a virtual store which sells private or controversial items, or in response to the user entering a location or encountering a situation where the user has in the past requested invisibility or some other privacy preserving mode, the system may detect that privacy is required, and the system may in response present a user interface which offers the Invisibility mode (possibly along with additional privacy mode options or tools). The user may then confirm that Invisibility mode should be selected, or may select a different privacy option or tool. Later, in response to the user exiting the location or in response to the system determining that the detected scenario no longer applies, the system may turn off invisibility, or may prompt the user with an option to turn off the Invisibility mode. In this way the system may prompt or remind the user during times when privacy is recommended or is likely to be needed. The invisibility option or tool may be used in combination with other privacy options, as will be detailed further below.

Exemplary User Interfaces.

User Selects a Single Privacy Mode.

Figure 6A:
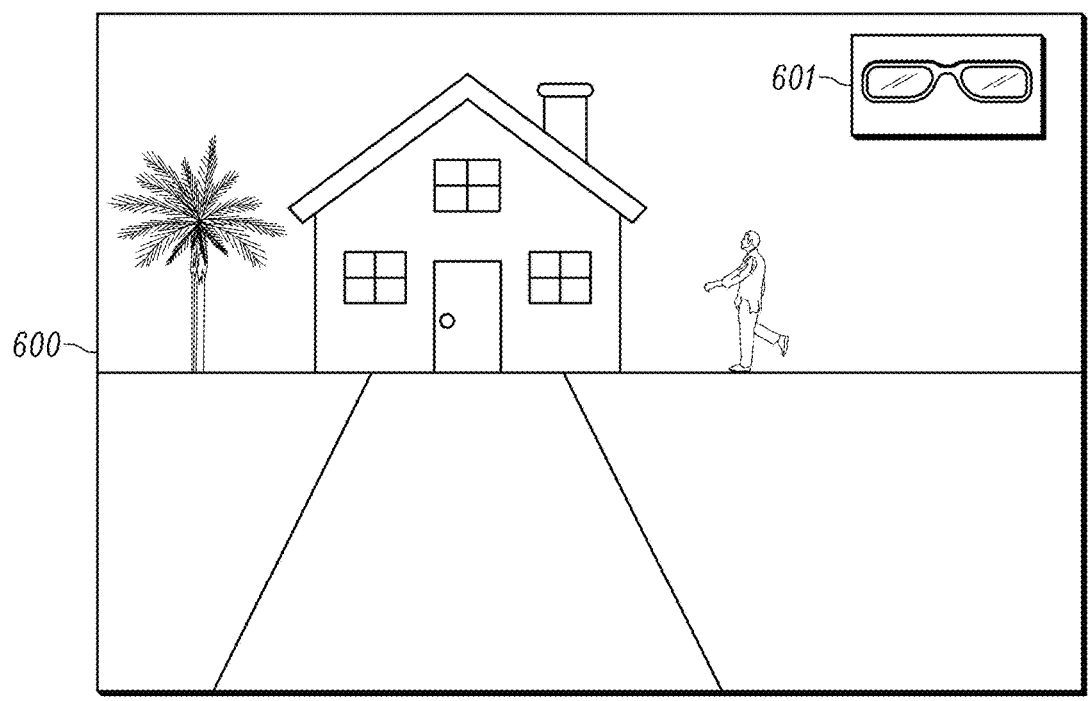
FIGS. 6A-6C illustrate stages in a user interaction with a user interface through which a user selects the Disguise privacy mode/tool from a list of multiple privacy modes/tools.
Figure 6B:
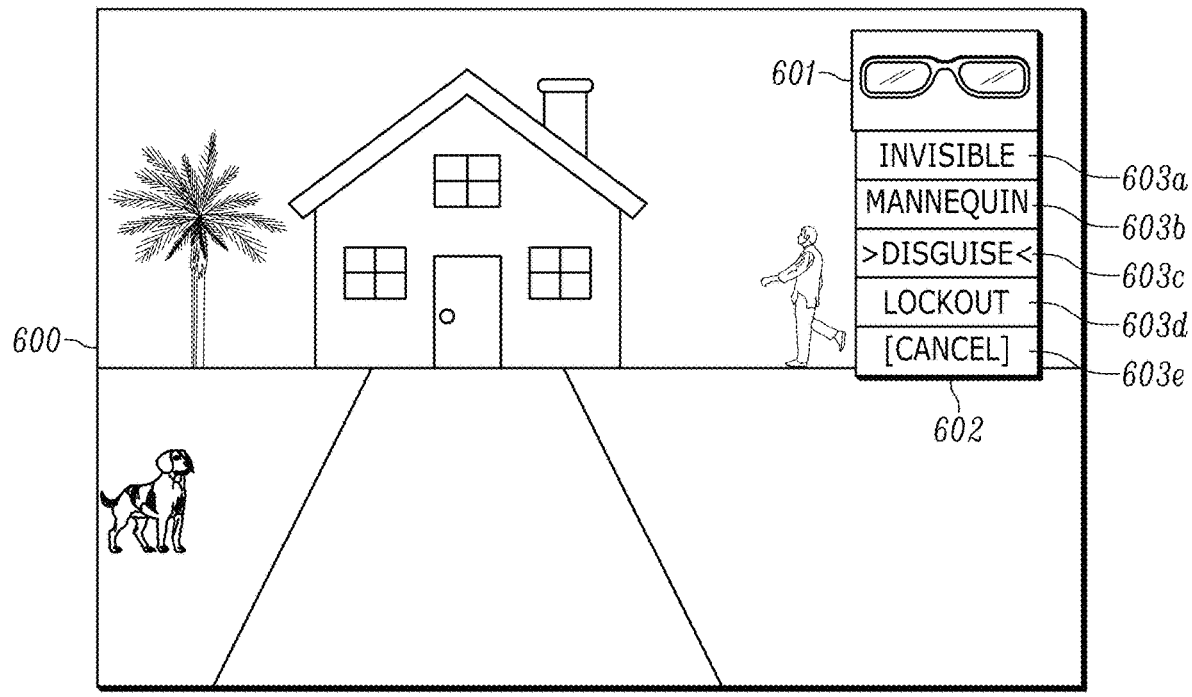
Figure 6C:
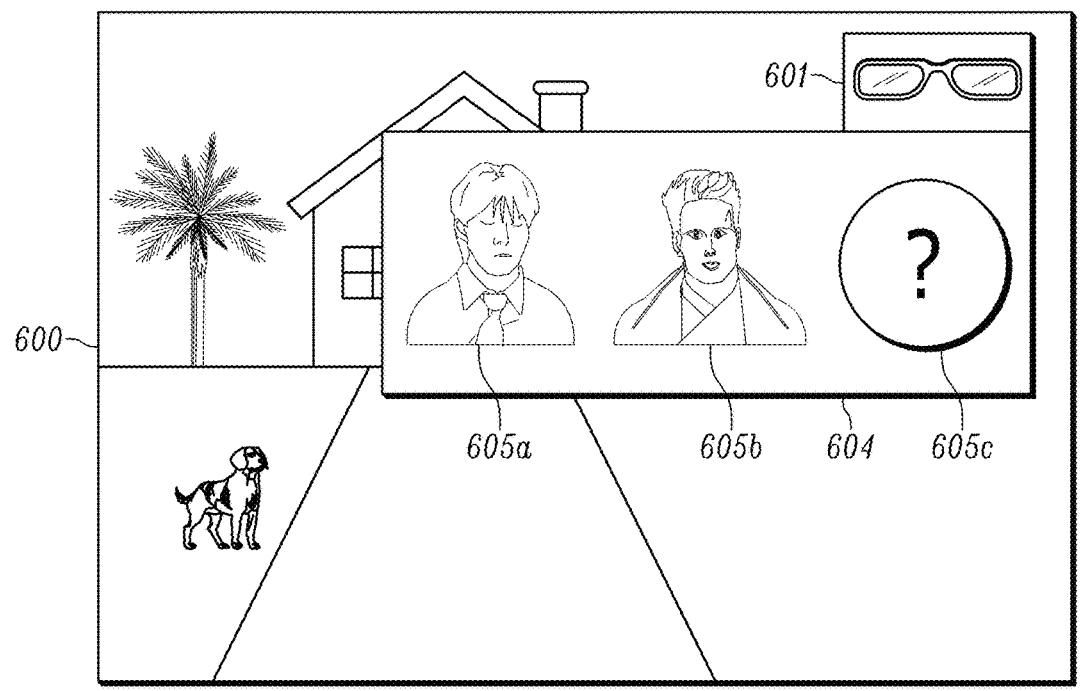

FIGS. 6A-6C illustrate stages in a user interaction with a user interface through which a user selects the Disguise privacy mode/tool from a list of multiple privacy modes/tools. In an exemplary embodiment, a system may present a user interface which allows the user to select, compose, configure, and/or edit a Plan. FIG. 6A illustrates a scene 600 from a VW experience. The user is approaching a house, and other users may be present (as shown by the walking figure). The system may provide a user interface element 601 which allows the user to select a privacy plan. In FIG. 6A, this is illustrated by the sunglasses icon 601 in the upper right corner of the screen.

The user may select the privacy plan user interface element 601 illustrated in FIG. 6A. In response, the system may present the user with a list of available Plans. For example, in FIG. 6B, the user is presented with a privacy plan configuration interface (menu) 602 which includes multiple privacy options 603a-603e (Invisible 603a, Mannequin 603b, Disguise 603c, and Lockout 603d). The user may choose one of the available Plans from menu 602 or cancel with menu option 603e. As illustrated in FIG. 6B, the user has chosen Disguise 603c.

Once the user chooses a privacy option, the system may prompt the user for additional information in order to configure the use of the privacy plan. For example, once the user has chosen Disguise 603c (as illustrated in FIG. 6B), the system may prompt the user to choose a form for the disguised avatar in option display 604. As illustrated in FIG. 6C, the user may choose from among disguise avatars Roger 605a and Bob 605b, which the user may have previously created and saved using an avatar editor, or the user may choose a Random option 605c in which the system generates a disguise avatar with a random appearance. Once the user chooses the options to configure the disguise avatar, the system may initiate the disguise mode, and the user may take on the form of the selected disguise avatar.

User Selects a Combination of Privacy Modes.

Figure 7A:
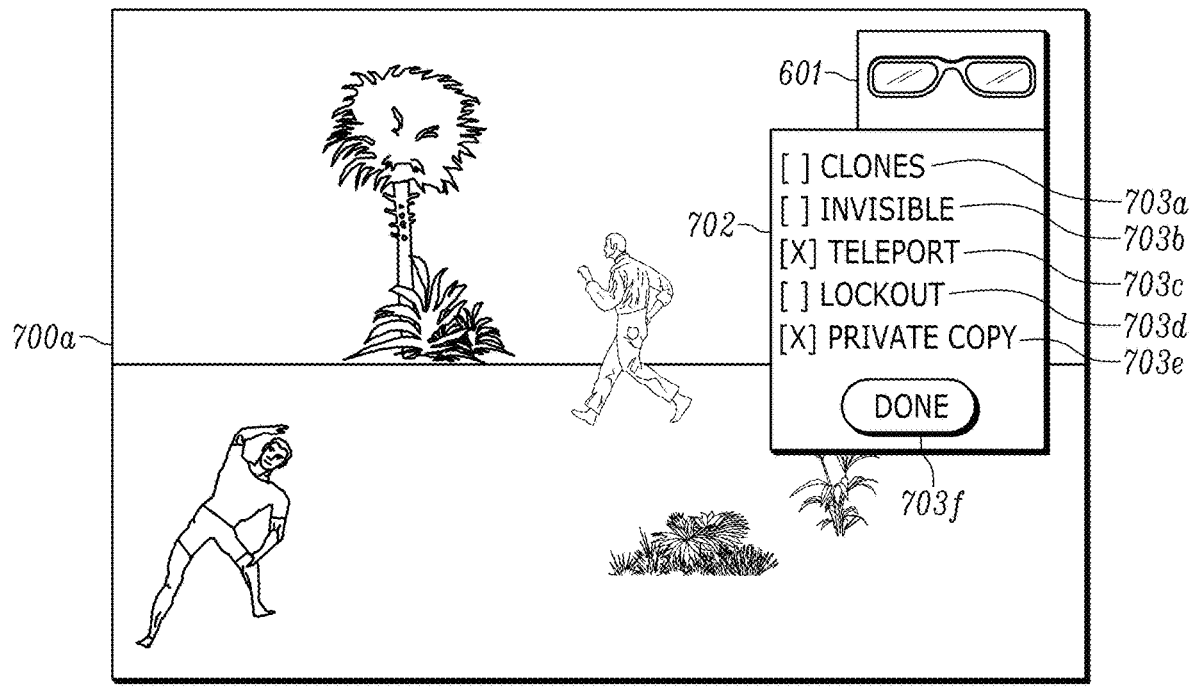
FIGS. 7A-7D illustrate stages in a user interaction with a user interface through which a user selects and uses a combination of privacy modes/tools from a user interface.
Figure 7B:
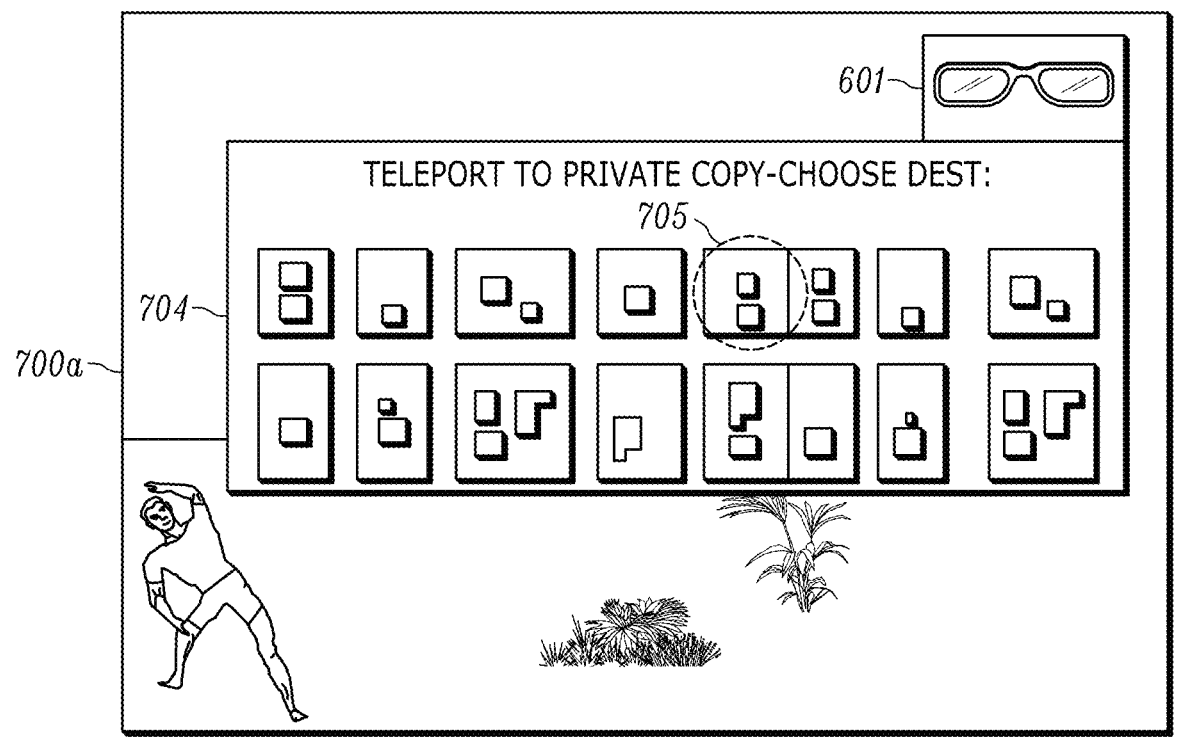

FIGS. 7A-7D illustrate stages in a user interaction with a user interface through which a user selects and uses a combination of privacy modes/tools from a user interface. In an exemplary embodiment, the system may present a user interface which allows the user to select multiple privacy plans to be used in combination or composited together in a manner defined by the user. For example, in FIG. 7A, illustrating a scene 700a from a VW experience the user is presented with privacy plan configuration interface (menu) 702, having multiple option elements Clones 703a, Invisible 703b, Teleport 703c, Lockout 703d, Private Copy 703e, and Done 703f. The user may select more than one privacy plan as part of a combination. While the user is selecting Plans, the system may indicate which Plans may be used together, or the system may restrict the users' choices so that only compatible privacy plans may be selected together. For example, the user may select Teleport 703c, and in response the system may gray out and/or may prevent subsequent selection of other Plans which cannot be used in combination with Teleport 703c. As illustrated, the user has selected a combination of Teleport 703c and Private Copy 703e, which may be used together in combination, in order to be teleported to a selected location in a private copy of the VW. The system may ascertain which privacy plans are compatible, and responsive to the user selecting a first privacy plan, selectively enabling or disabling other selection options in the privacy plan configuration interface, based on compatibility with the first selected privacy plan. The user selects Done 703f to finalize the selection.

FIG. 7A illustrates scene 700a in which the user is in a public park. Other users may be present, as illustrated by the avatars exercising in the park. The user may feel like gambling, but the user does not want others to see him enter a casino or see him playing the slot machines. In response to the user's Teleport 703c selection, the system may then prompt the user for additional information in order to configure how the selected tools will be used. For example, in FIG. 7B the system displays a map 704 and asks the user to select a destination for the Teleport. The user may select a location or area on the map indicated by circle 705. In this case, the user selects the location of the Center View Casino. Once the teleport destination is selected, the system may teleport the user to the Center View Casino, and may spawn a Private Copy of the casino for private use by the user.

Figure 7C:
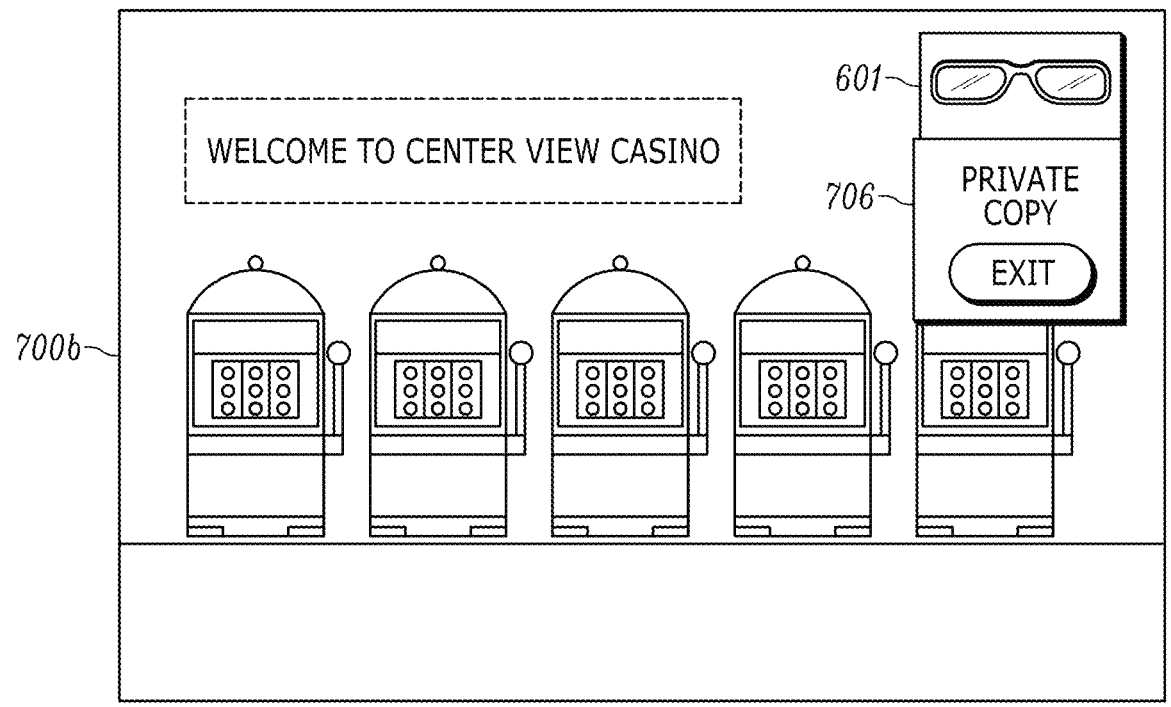

FIG. 7C shows the resulting Private Copy of the Center View Casino upon arrival via teleportation in scene 700b. A privacy mode indicator 706 underneath the privacy options icon in the upper right corner of the view indicates that the user in engaged in a Private Copy of the current location, and it also provides an option to EXIT from the Private Copy mode. The user may interact with the current location, for example the user may play the slot machines on the casino floor, without risk of other users or bots observing the user in the casino. When the user is finished in the casino, the user may choose to EXIT the private copy.

Figure 7D:
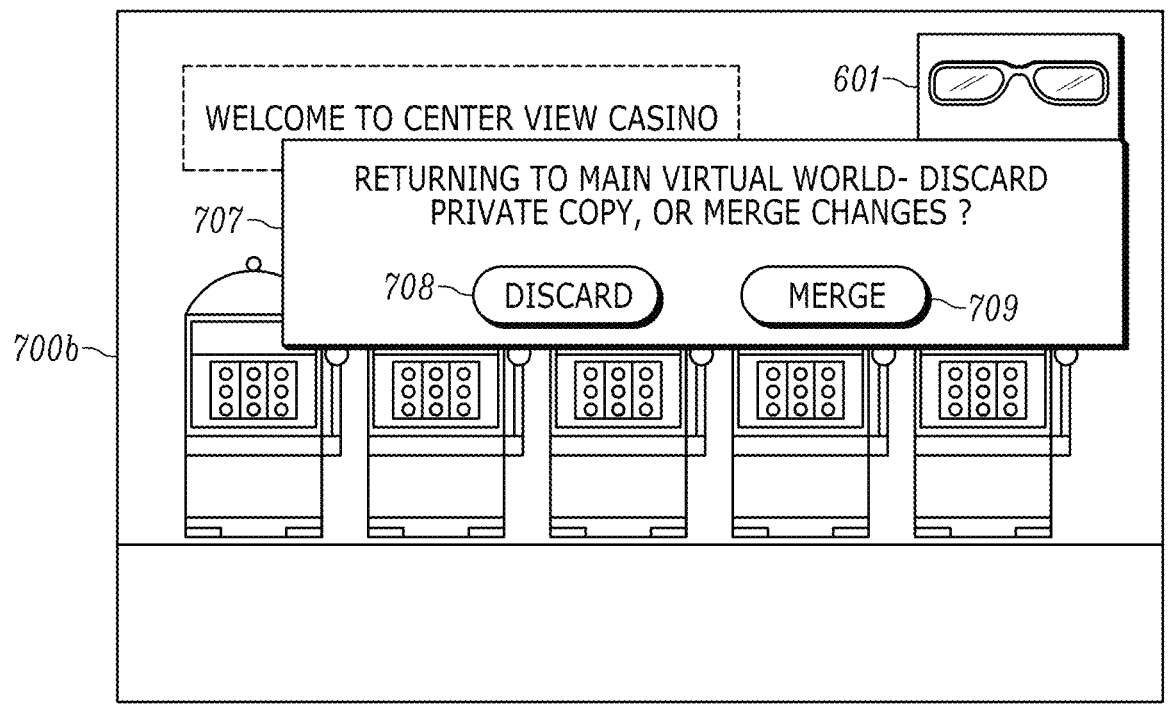

In response to a user selection to exit the Private Copy, the system may prompt the user to choose whether the private copy (including any changes or modifications made by the user to the environment) should be discarded, or should be merged back to the main VW. This choice is illustrated in selection dialog box 707, illustrating the Discard option 708 and the Merge option 709. FIG. 7D. In response to the user selection of whether to discard or merge the changes, the system will perform the merge (if applicable), the private copy resources will be freed, and the user will be returned to the main (public) copy of the VW.

Figure 8:
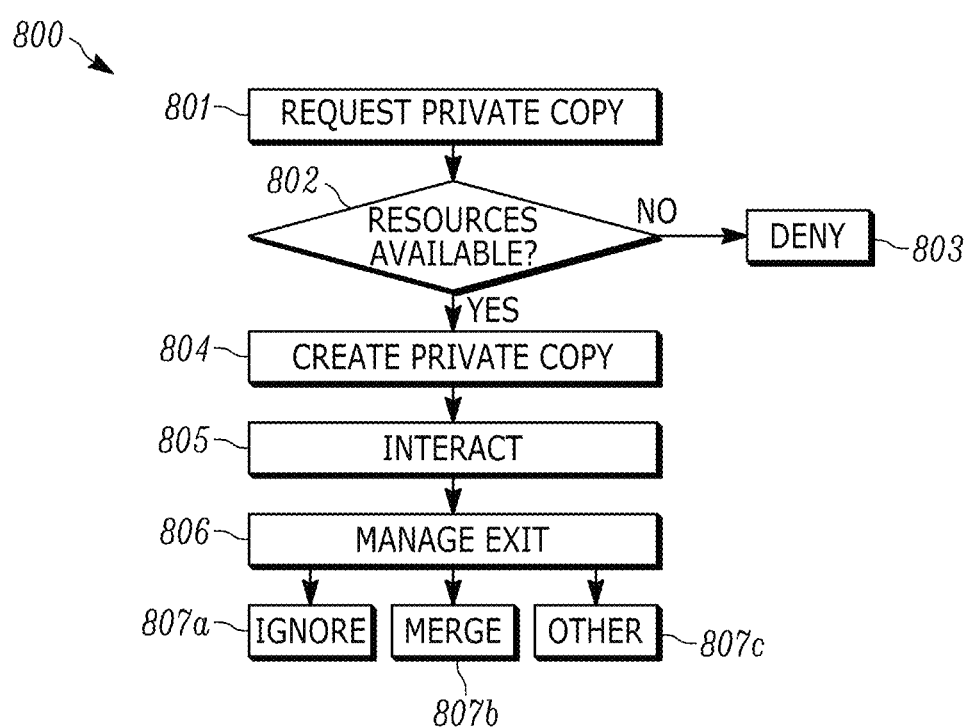
FIG. 8 is a flow chart illustrating an exemplary method of using a private copy.

FIG. 8 is a flow chart illustrating an exemplary method 800 of using a private copy. Method 800 stats in box 801, when a user requests a private copy. In decision box 802, the system determines whether resources are available, such as sufficient memory, processor power, or bandwidth. If not, then the request is denied in box 803. Otherwise, method 800 proceeds to box 804 where a private copy is created. The user interacts with the private copy in box 806, and then when done, there is a managed exit in box 806. Multiple options are available, as indicated by boxes 807a-807c, which are Ignore, Merge, and other options, respectively. With Ignore 807a, the changes occurring in the private copy may be ignored, whereas with Merge 807b, some of the changes may affect the public VW.

System Recommends a Privacy Plan Based on Current Context.

In some embodiments, the system may present a user interface which allows the user to ask for help in selecting an appropriate privacy plan for the current context. In response to the user requesting this help, the system may analyze the current scenario and may recommend a plan. FIGS. 9A-9D illustrate stages in a user interaction with a user interface, through which a system recommends a privacy mode/tool from among multiple privacy modes/tools based on the current context. For example, with respect to FIGS. 9A-9D, the user may be shopping in a virtual mall, and may come upon a department which is having an underwear sale, as illustrated by scene 900 in FIG. 9A.

Figure 9A:
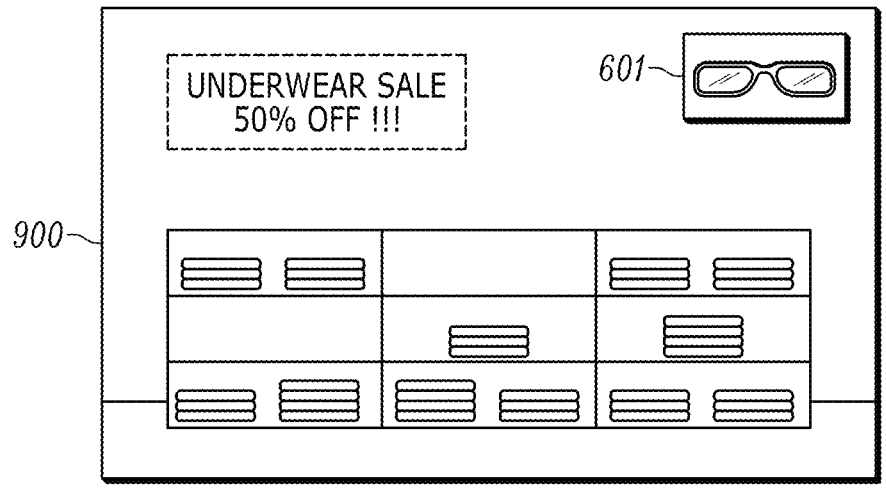
FIGS. 9A-9D illustrate stages in a user interaction with a system recommending a privacy mode/tool from among multiple privacy modes/tools.
Figure 9B:
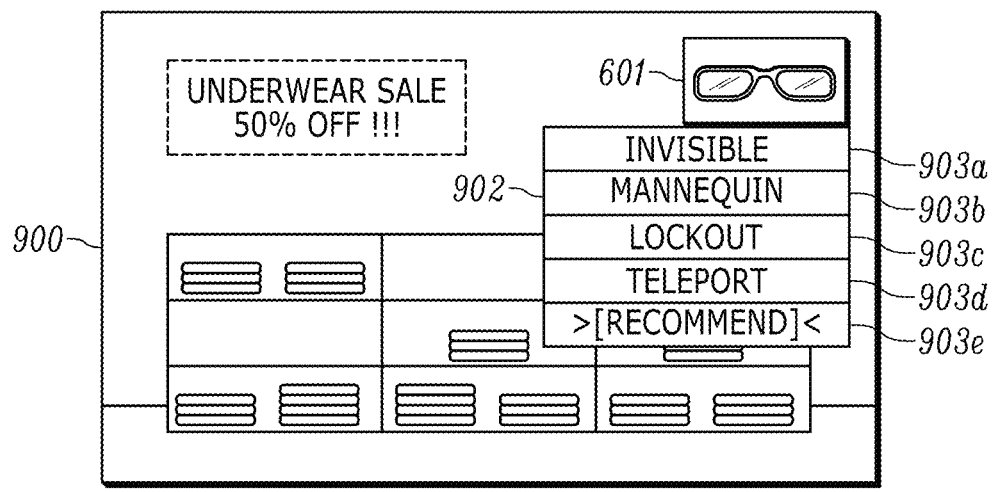
Figure 9C:
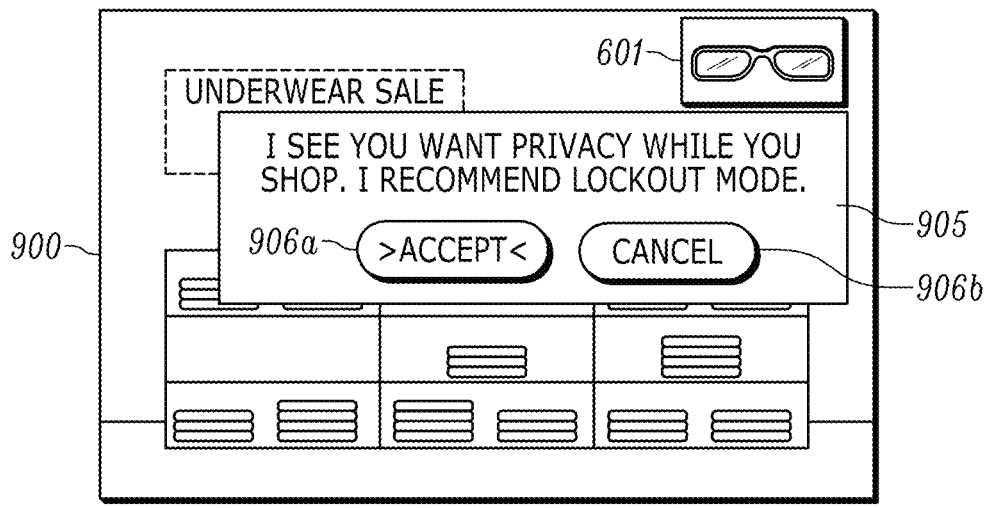

The user may not want other users or bots to observe the user shopping for underwear, so the user may select the privacy plan icon 601 (user interface element 601 which is illustrated by sunglasses icon 601 in the upper right corner of the screen). In response to selection of the privacy options icon, the system may present a list in a privacy plan configuration interface (menu) 902 of the available privacy plans, as illustrated in FIG. 9B. Menu 902 includes various options such as Invisible 903a, Mannequin 903b, Lockout 903c, and Teleport 903d. The list may also include an option in which the system recommends privacy plans, which is illustrated as Recommend 903e. As shown, the user has selected Recommend 903e, in order to get help with choosing an appropriate plan.

In some embodiments, the system may analyze the user's current scenario in order to determine an appropriate privacy plan for the current context. For example, the system may determine that the user is shopping, and that the user is in a sensitive or embarrassing department within the store. The system may consider past history of the user, to determine which privacy modes the user may regularly use. The system may check to see whether any other users or bots are present in the local area.

Based on determining that no users or bots are present in the local area, and/or that the user has selected Lockout in the past, the system may determine that Lockout is an appropriate plan for the user's current shopping scenario. The system may thus recommend the user to engage Lockout. This choice is illustrated in selection option dialog box 905, which is another form of a privacy plan configuration interface, as presenting the Accept option 906a and the Cancel option 906b in FIG. 9C. Because Lockout was previously identified as relevant privacy pan for the trigger conditions, it is presented as a recommendation. This scheme can be used for other privacy plans: defining a set of trigger conditions, monitoring for those conditions to be triggered, and if so, presenting the user with a recommendation to implement a previously defined Plan or set of Plans. Recommendations by a server may be based on trigger conditions either previously defined by the user or based on the system's own criteria, possibly developed through machine learning. In this latter situation the trigger conditions include conditions that had not been previously specified by the user.

As indicated, the user accepts the recommendation by selecting the Accept option 906a from among a plurality of options 906a and 906b. In response, the system may engage Lockout for the local area of the store. While Lockout is in use, no users or bots may enter the local area where the user is shopping for underwear, and no users or bots may observe the user's actions from outside of the local area.

Figure 9D:
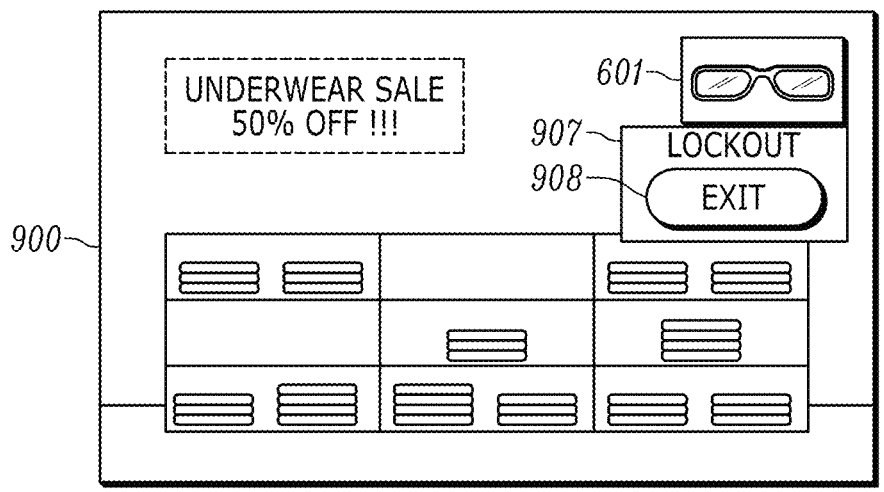

The user interface may display an indication that Lockout is in use, as illustrated in FIG. 9D, by displaying Lockout mode indicator 907. The user interface may also provide an EXIT option 908 exit from Lockout mode. After the user exits from Lockout, other users and bots will be able to enter the local area, and/or will be able to observe the local area and the user.

System Recommends a Privacy Mode Based on Detecting a Need.

In an exemplary embodiment, the system may determine that the user is in a situation which may call for privacy, and may prompt the user to engage a privacy plan. The system may prompt the user to engage a particular privacy plan from among multiple options. The system may determine which Plan to engage based on the current context, the current location, and/or the past history of the user's behavior.

Figure 10A:
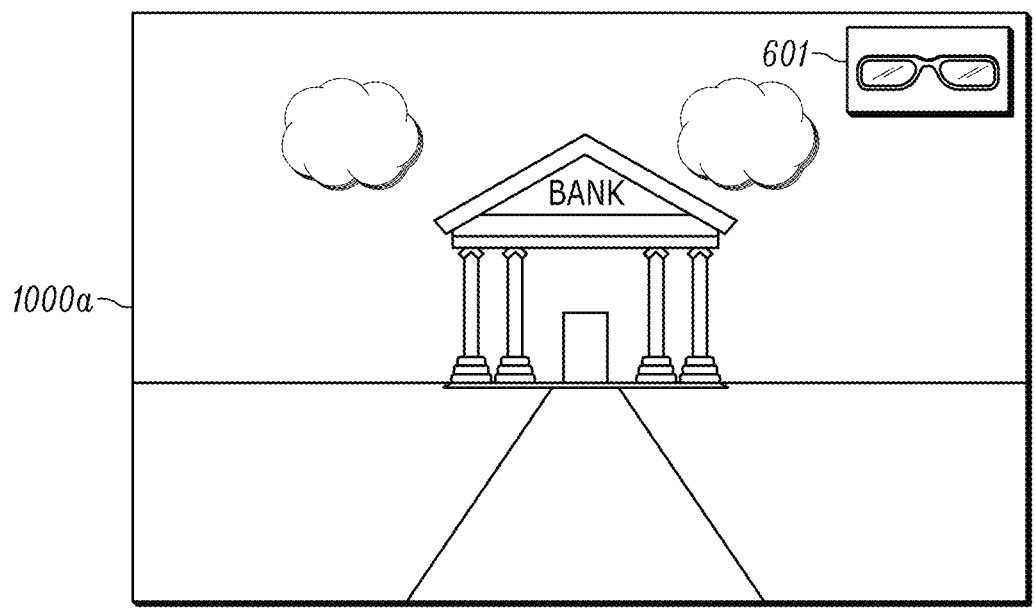
FIGS. 10A-10C illustrate stages in a user interaction with a system detecting that user is encountering a situation in which privacy may be needed.
Figure 10B:
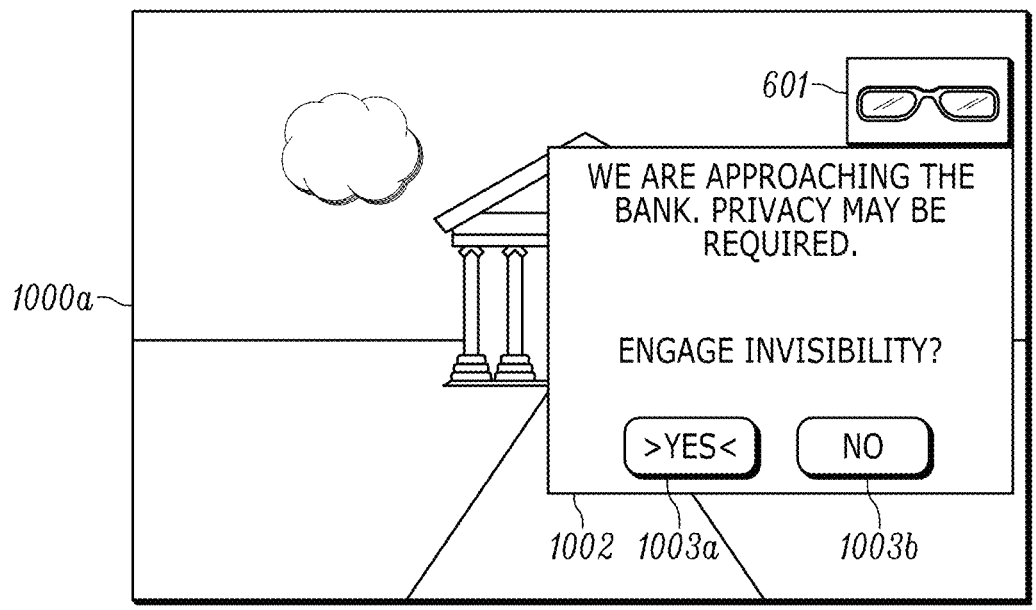
Figure 10C:
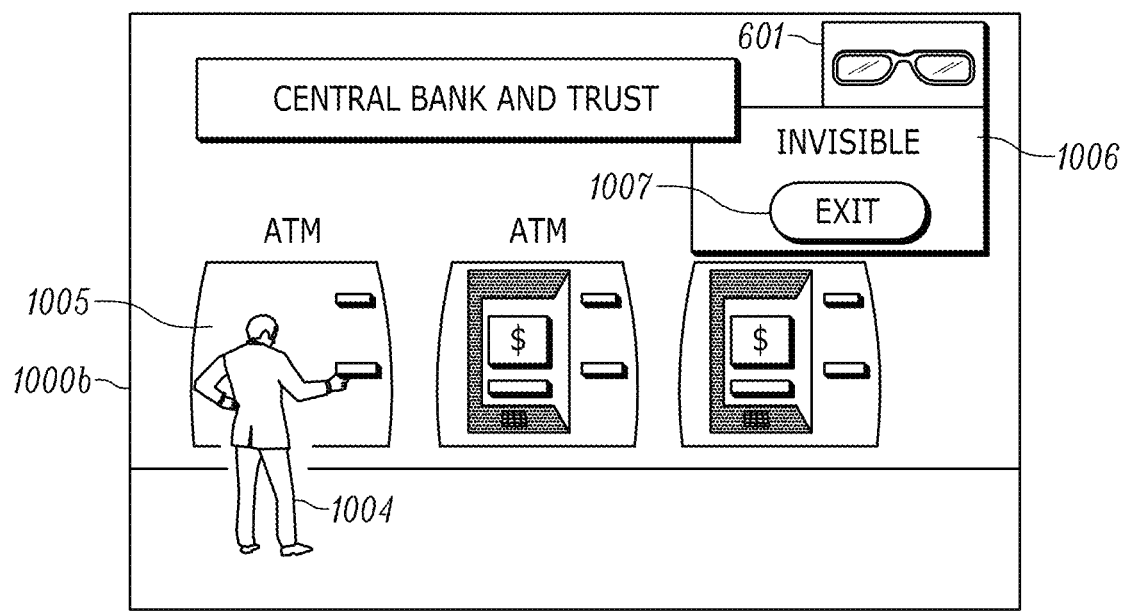

FIGS. 10A-10C illustrate stages in a user interaction with a system detecting that user is encountering a situation in which privacy may be needed. FIG. 10A illustrates a VW experience in which the user is approaching a bank in a scene 1000a. A privacy options icon 601 may be available, and by selecting icon 601, the user may access a privacy plan configuration interface (menu) listing available Plans. However, in the current example, the user does not select the privacy options icon. Rather, FIGS. 10A-10C illustrate stages in which a system detects that user is encountering a situation in which privacy may be called for, and in response, the system recommends a privacy plan to the user.

As illustrated in FIG. 10B, the system may determine that the user is in a scenario which may require privacy (i.e., that the user is approaching the bank), and in response, the system recommends that the user engage a privacy plan by displaying selection option dialog box 1002. Selection option dialog box 1002 is another form of a privacy plan configuration interface, and recommends invisibility and offers a Yes option 1003a and a No option 1003b.

In one embodiment, the system may have a list of sensitive locations which may call for privacy, and in this example the system may trigger the recommendation based on the determination that the user's avatar is approaching or is within one of the locations on the sensitive locations list. In another embodiment, the system may monitor and record the user's past interactions and so may have a record of one or more past instances in which the user engaged a privacy plan while visiting a bank. Based on the past record of user interactions, the system may always offer to engage a privacy plan when the user visits the bank, based on the user's observed preference for privacy in this location.

As illustrated in FIG. 10B, the system prompts the user to engage a privacy plan. In this example, the system prompts the user to engage the Invisibility plan. Recommendation of a particular privacy plan may be based on the current context, the current location, and/or the user's past history. For example, the system may have a list of sensitive locations which includes a recommended privacy plan to engage in each location, and the system may consult this list in order to determine the recommended privacy plan when a user is in one of the sensitive locations. As another example, the system may have a historical record of the current user's interactions, and the historical record may show that the user has in the past engaged Lockout plans when entering the bank. As yet another example, the user may have previously been presented with a privacy plan configuration interface in which the user specified trigger conditions for the system to monitor, and then when triggered, either automatically engage a privacy plan or automatically display another privacy plan configuration interface with recommendations for the user to engage a privacy plan.

With Invisibility engaged, the user may enter the bank in scene 1000*b*, and may approach a bank of virtual ATM machines, as illustrated in FIG. 10. Other users or bots may be present, as illustrated by the avatar 1004 using the ATM machine 1005 at the left side of the view. The user's avatar may not be seen by such users while the user is invisible.

The system may display a privacy plan indicator 1006 which indicates that the user is invisible. This is illustrated in FIG. 10 by the word "Invisible" is displayed beneath the Privacy options icon 601 at the upper right corner of the view. The system may also provide a control to allow the user to exit from Invisibility with EXIT icon 10007. Once Invisibility terminates, then other users and bots will again be able to see the user's avatar.

In an embodiment, the user may employ a user interface to specify his preference for when and how an exemplary system is triggered. In turn, once specified, the user preferences may allow the system to proactively trigger an appropriate privacy plan. The following are means by which this could be accomplished. In some embodiments, a user may select a particular part of the VW by its identifier (e.g., "map 3", "region 4", "structure 5", etc.) or by boundaries, etc., and may request that the system be triggered in response to the user avatar being at that place. In some embodiments, the system may be triggered in response to the user nearing the identified place. In some embodiments, the user may specify a trigger using a machine-readable taxonomy of places such as by indicating "trigger the system whenever I'm at a STORE that sells WATCHES," where the terms STORE and WATCHES are from the taxonomy. In some embodiments, the user may, at specification time, indicate the level or type of increased privacy that she would like from a set of available options (on a user interface). The user may also specify conditions under which the privacy plan would terminate (e.g., after some time, when reaching some named place, etc.). Therefore, having specified the conditions under which privacy should be increased and the type of privacy desired, the user can put the triggering into the hands of the system.

Automatic Privacy Mode.

In some embodiments, a privacy mode may be triggered automatically, e.g. in response to a detected event or events. Certain legal frameworks, such as the European General Data Protection Regulations (GDPR) may be used as a basis for determining privacy needs when interacting with avatars in the VW. For example, the GDPR identifies certain categories of types of information which require explicit, rather than merely implied, permission from the data subject. If some avatar in a VW began inquiring of the user's avatar on subjects identified by the GDPR as subject to heightened permission requirements, the system could create trigger a warning to the user or else may automatically initiate a privacy mode such as Disguise.

One exemplary method implements a process of monitoring trigger conditions, responsive to detecting a trigger condition, automatically selecting a privacy plan for the VR user; and then implementing or recommending, to the VR user, the automatically selected privacy plan. The method proceeds as follows:

1. The system makes a determination that it would be advantageous to initiate increased privacy. For example, the system may detect a situation where the user is being surveilled by one or more avatars or bots.
2. The system selects all or some of the options that enable a particular privacy plan.
3. The system checks whether the VR framework is prepared to accept the privacy method and if so, the privacy method begins. (If not, it may reset or fail with an optional message to the user).
4. Alternatively, the user is provided a recommendation to accept the privacy plan or plans.
5. The user is informed (via GUI or other interface) about the imminent start of the privacy plan (and optionally some of its details such as time period, etc.).
6. The privacy plan is implemented, for example, a set of N clones is created and each begins to execute its prescribed behavior.

Such a method implements a process of monitoring trigger conditions, responsive to detecting a trigger condition, automatically selecting a privacy plan for the VR user; and then implementing or recommending, to the VR user, the automatically selected privacy plan.

Figure 11:
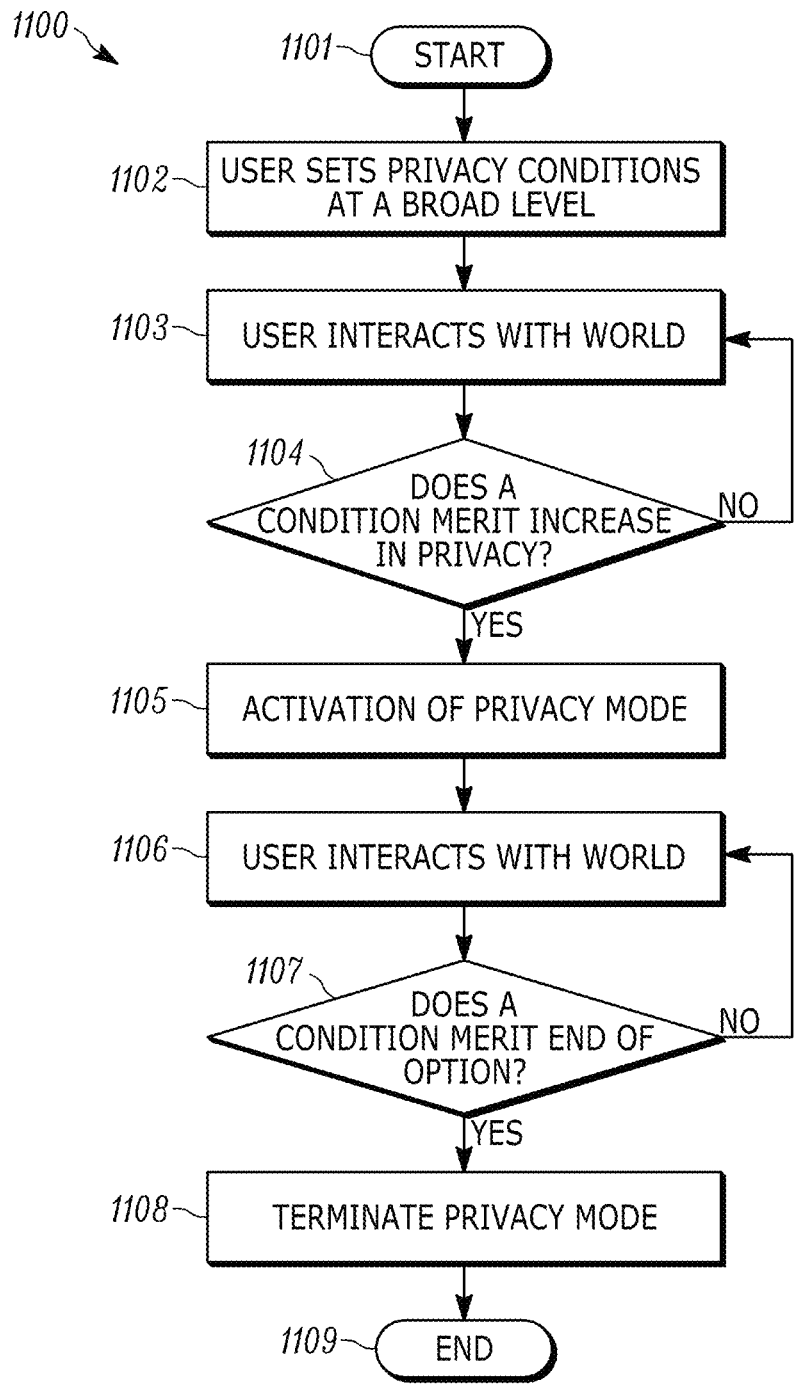
FIG. 11 is a flowchart illustrating an exemplary method in which a privacy plan is automatically triggered by a system.

FIG. 11 is a flowchart illustrating an exemplary method 1100 in which a privacy plan is automatically triggered by a system, based on the preferences of the user. Method 1100 starts in box 1101. In box 1102, the user sets privacy conditions and interacts with a VW in box 1103. In decision box 1104, the system determines whether an increase in privacy is merited, continuing to monitor if it is not. If so, then in box 1105, privacy mode is activated with an appropriate privacy plan or set of plans. In box 1106, the user interacts with the VW with the heightened privacy. In decision box 1107, the system determines whether a relaxation of in privacy is merited, continuing to monitor if it is not. If so, then in box 1108, one or more of the activated privacy plans is terminated. Method 1100 then ends in box 1109.

The system may use patterns of past behavior or other heuristics to capture the conditions under which privacy options will be triggered for this user in the particular VW. A termination condition may also be specified. Users may specify preferences in any one of several means including but not limited to (i) free text, followed by language parsing by the system; (ii) filling out a template from a structured language like XML or JSON; and/or (iii) using a user interface to choose from options.

Configuring, Editing and/or Extending a Privacy Plan.

In some embodiments, a system provides a user interface by which a user may configure, edit, and/or extend a privacy plan. The user interface may present a list of available privacy plans, and the user may select one of the privacy plans in order to customize it. The user may view details such as a plan description, one or more control parameters, behaviors associated with the plan, entities associated with the plan, and/or the like. The user may use the interface to edit one or more parameters associated with the privacy plan. In an advanced interface, the user may modify instructions or code in order to change how the plan operates. The user may modify and/or customize a base plan, and may save the modified plan for later use.

Figure 12A:
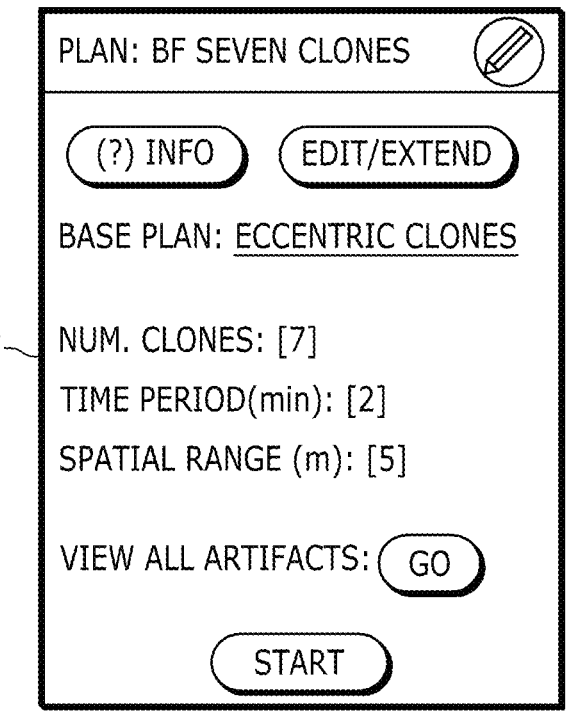
FIGS. 12A-12D illustrate exemplary user interfaces for configuring, editing, and/or extending a privacy plan.
Figure 12B:
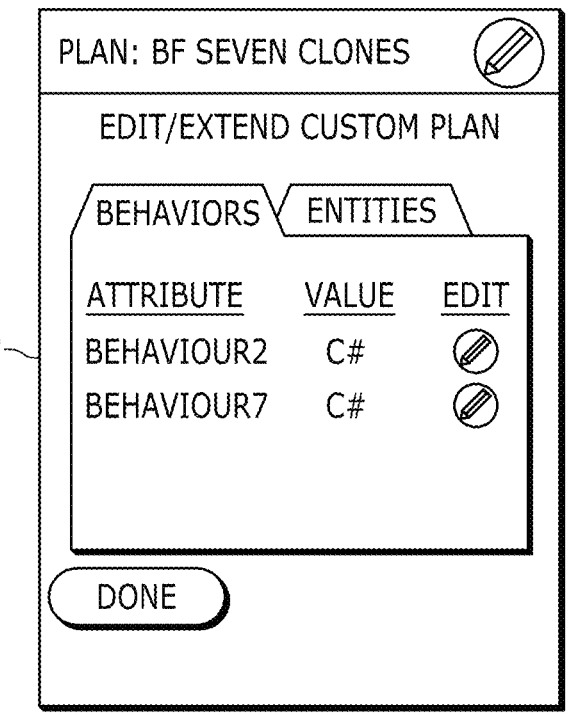

FIGS. 12A-12D illustrate exemplary user interfaces for configuring, editing, and/or extending a privacy plan. FIG. 12A provides a top-level view user interface 1201 by which a user may obtain information about an existing Plan and may access configuration and/or editing features. As depicted in FIG. 12A, the user interface may comprise an Info control, an Edit/Extend control, various parameter setting controls, and a control to view artifacts of the Plan. The Info control may allow the user to access a human readable description of the Plan. For example, if the user invokes the Info control for the EccentricClones base plan, the user interface may display a description of the Eccentric Clones plan (e.g. "Eccentric Clones spawns multiple autonomous clones of your avatar in order to confuse nearby observers. Use the configuration parameters to configure how these clones behave.") The Edit/Extend control may allow the user to view behaviors and/or entities associated with the Plan, and to access editing functionality for such behaviors and/or entities, as illustrated in FIG. 12B. The various parameter settings may be editable by the user in order to configure the plan behaviors. For example, as illustrated in FIG. 12A, the user may be able to set the number of clones (illustrated as 7), a time period for the clones to be active (illustrated as 2 minutes), and a spatial range over which the clones may roam (illustrated as 5 meters). While these parameters are specific to the EccentricClones plan, in general the user interface may present editable parameters appropriate to the configuration of any privacy plan.

FIG. 12B is an illustration of a user interface 1202 through which the user may view behaviors and/or entities of the selected plan, and may access the associated editing functions. For example, Behavior2 and Behavior7 are behaviors of an exemplary EccentricClones plan which may have corresponding implementation in the C # programming language. The user may select an editing icon in order to view, modify, and/or save a modified version of the corresponding implementation code as illustrated for Behavior2 in user interface 1203 of FIG. 12C. While modifying the implementation of a behavior, the user may define new user-editable parameters which may then be exposed as user-editable parameters in interface 1201, illustrated in FIG. 12A.

Figures 12C, 12D:
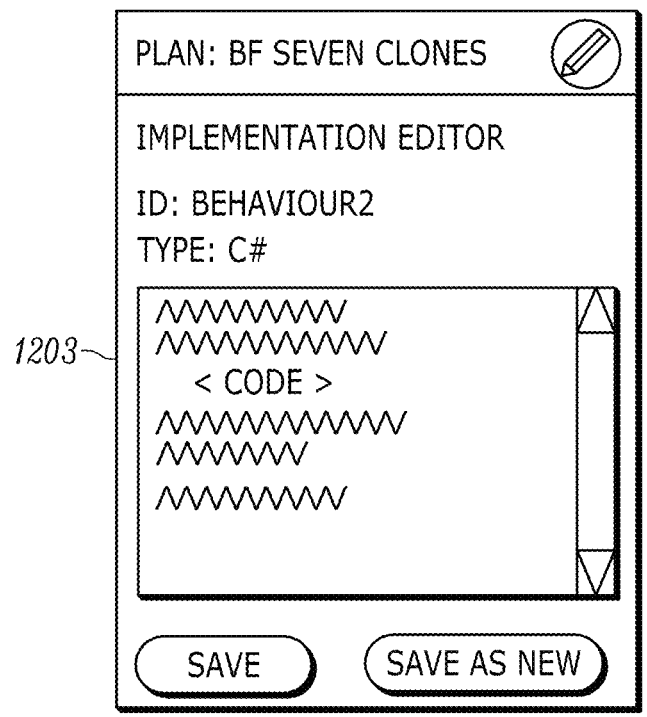

Control to view artifacts of a Plan may allow the user to transition to a view which shows details of the various artifacts (e.g. behaviors and/or entities) associated with the plan, as illustrated by user interface 1204 of FIG. 12D. Whereas user interface 1203 of FIG. 12C enables a user to edit implementation instructions in the C # programming language, interface 1204 of FIG. 12D enables a user to edit data and objects. For example, an object identified by the label Artifact 1205a has fields Type 1205b, Name 1205c, and Details 1205d. A specific artifact, BXGX23 (element 1206) is illustrated, although other artifacts may also be listed. In Type field 1205b, there is Behavior Entity data, a name 1208 specified as "B123". To prevent too much information appearing on the screen, there is a View button 1209 in Details field 1205d. Upon selection of View button 1209, the details will be displayed to the user.

Exemplary Use Case.

The following is an additional descriptive/illustrative use case that shows how exemplary embodiments may be employed. In an exemplary use case, a user may be in a VW called "VRShopper" that is filled with virtual malls and shops with products he could look at, try on, and buy. The user may specify preferences for increased privacy as such: "When I look at Rolex products, give me increased privacy using a preferred privacy mode/tool (e.g. the eccentric clones method where clones are moderately randomized"). Later, when that user is approaching a store registered to serve Rolex products, the system triggers the eccentric clones, each of which spreads out from the current location and mills about other nearby stores (that do not sell Rolex products). Meanwhile, the user's avatar can gain some anonymity by browsing the Rolex store knowing that anyone watching will not be sure where the user's true attention is. For example, someone monitoring the user may be unable to discern whether the user embodies the avatar at the Rolex store or one of the other similar avatars nearby at other stores. Later, the user moves away from the Rolex store and the system gracefully terminates the privacy mode.

Exemplary System Hardware.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Exemplary embodiments disclosed herein may be implemented using one or more wired and/or wireless network nodes, such as a wireless transmit/receive unit (WTRU) or other network entity.

Figure 13:
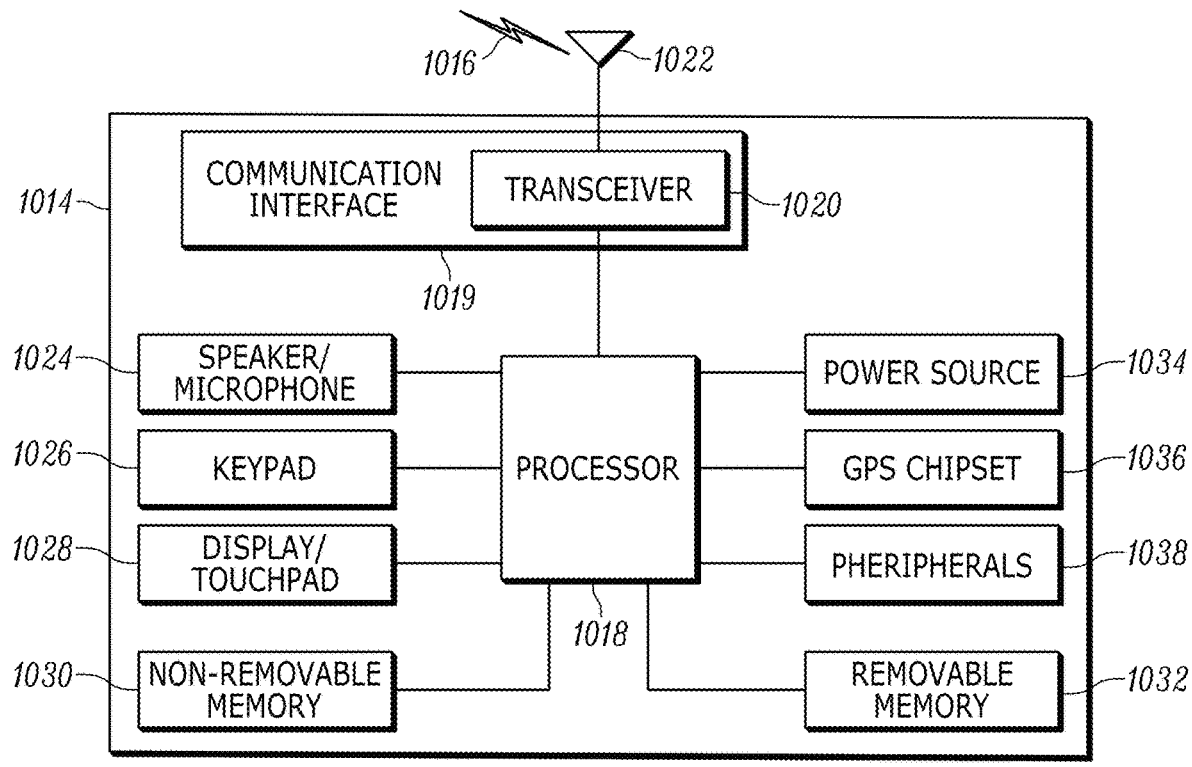
FIG. 13 illustrates an exemplary wireless transmit/receive unit (WTRU) that may be employed as a user computing device, such as a virtual reality display device, in some embodiments.

FIG. 13 is a system diagram of an exemplary WTRU 1014, which may be employed as a user computing device, such as a virtual reality display device, in embodiments described herein. As shown in FIG. 13, the WTRU 1014 may include a processor 1018, a communication interface 1019 including a transceiver 1020, a transmit/receive element 1022, a speaker/microphone 1024, a keypad 1026, a display/touchpad 1028, a non-removable memory 1030, a removable memory 1032, a power source 1034, a global positioning system (GPS) chipset 1036, and sensors/peripherals 1038. It will be appreciated that the WTRU 1014 may include any sub-combination of the foregoing elements while remaining consistent with an embodiment.

Processor 1018 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. Processor 1018 may perform signal coding, data processing, power control, input/output processing, and/or any other functionality that enables WTRU 1014 to operate in a wireless environment. Processor 1018 may be coupled to transceiver 1020, which may be coupled to transmit/receive element 1022 to communicate wirelessly over an air interface 1016. While FIG. 13 depicts Processor 1018 and transceiver 1020 as separate components, it will be appreciated that processor 1018 and transceiver 1020 may be integrated together in an electronic package or chip.

Transmit/receive element 1022 may be configured to transmit signals to, or receive signals from, a base station over air interface 1016. For example, in one embodiment, transmit/receive element 1022 may be an antenna configured to transmit and/or receive RF signals. In another embodiment, transmit/receive element 1022 may be an emitter/detector configured to transmit and/or receive IR, UV, or visible light signals, as examples. In yet another embodiment, transmit/receive element 1022 may be configured to transmit and receive both RF and light signals. It will be appreciated that transmit/receive element 1022 may be configured to transmit and/or receive any combination of wireless signals.

In addition, although transmit/receive element 1022 is depicted in FIG. 13 as a single element, the WTRU 1014 may include any number of transmit/receive elements 1022. More specifically, WTRU 1014 may employ MIMO technology. Thus, in one embodiment, WTRU 1014 may include two or more transmit/receive elements 1022 (e.g., multiple antennas) for transmitting and receiving wireless signals over air interface 1016.

Transceiver 1020 may be configured to modulate the signals that are to be transmitted by transmit/receive element 1022 and to demodulate the signals that are received by transmit/receive element 1022. As noted above, the WTRU 1014 may have multi-mode capabilities. Thus, transceiver 1020 may include multiple transceivers for enabling the WTRU 1014 to communicate via multiple RATs, such as UTRA and IEEE 802.11, as examples.

Processor 1018 of WTRU 1002 may be coupled to, and may receive user input data from, speaker/microphone 1024, keypad 1026, and/or display/touchpad 1028 (e.g., a liquid crystal display (LCD) display unit or organic light-emitting diode (OLED) display unit). Processor 1018 may also output user data to speaker/microphone 1024, keypad 1026, and/or display/touchpad 1028. In addition, processor 1018 may access information from, and store data in, any type of suitable memory, such as non-removable memory 1030 and/or removable memory 1032. Non-removable memory 1030 may include random-access memory (RAM), read-only memory (ROM), a hard disk, or any other type of memory storage device. Removable memory 1032 may include a subscriber identity module (SIM) card, a memory stick, a secure digital (SD) memory card, and the like. Non-removable memory 1030 and removable memory 1032 comprise non-transitory computer-readable media. In some embodiments, processor 1018 may access information from, and store data in, memory that is not physically located on WTRU 1014, such as on a server or a home computer (not shown).

Processor 1018 may receive power from power source 1034, and may be configured to distribute and/or control the power to the other components in WTRU 1014. Power source 1034 may be any suitable device for powering WTRU 1014. As examples, power source 1034 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

Processor 1018 may also be coupled to GPS chipset 1036, which may be configured to provide location information (e.g., longitude and latitude) regarding the current location of WTRU 1014. In addition to, or in lieu of, the information from GPS chipset 1036, WTRU 1014 may receive location information over air interface 1016 from a base station and/or determine its location based on the timing of the signals being received from two or more nearby base stations. It will be appreciated that WTRU 1014 may acquire location information by way of any suitable location-determination method while remaining consistent with an embodiment.

Processor 1018 may further be coupled to other sensors/peripherals 1038, which may include one or more software and/or hardware modules that provide additional features, functionality and/or wired or wireless connectivity. For example, sensors/peripherals 1038 may include sensors such as an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 14:
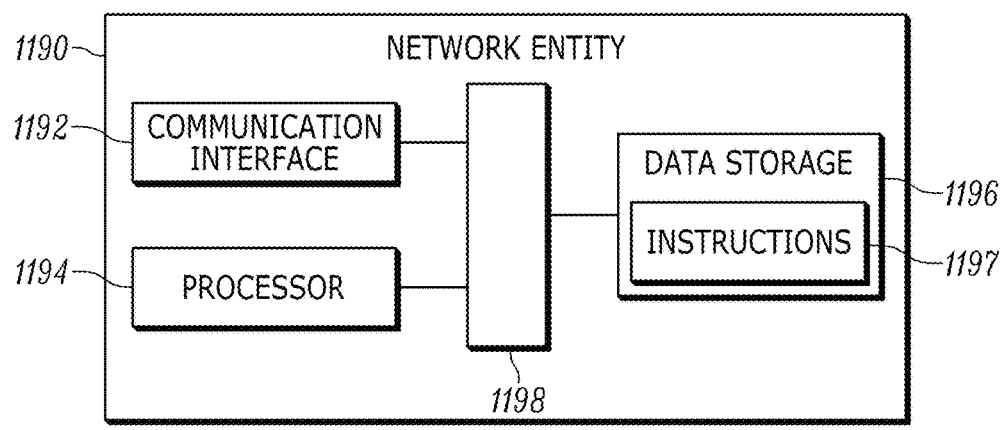
FIG. 14 illustrates an exemplary network entity that may be employed as a virtual reality server or third-party privacy server in some embodiments.

FIG. 14 depicts an exemplary network entity 1190 that may be used in embodiments of the present disclosure, for example as a virtual reality server or a third-party privacy server. As depicted in FIG. 13, network entity 1190 includes a communication interface 1192, a processor 1194, and non-transitory data storage 1196, all of which are communicatively linked by a bus, network, or other communication path 1198.

Communication interface 1192 may include one or more wired communication interfaces and/or one or more wireless-communication interfaces. With respect to wired communication, communication interface 1192 may include one or more interfaces such as Ethernet interfaces, as an example. With respect to wireless communication, communication interface 1192 may include components such as one or more antennae, one or more transceivers/chipsets designed and configured for one or more types of wireless (e.g., LTE) communication, and/or any other components deemed suitable by those of skill in the relevant art. And further with respect to wireless communication, communication interface 1192 may be equipped at a scale and with a configuration appropriate for acting on the network side—as opposed to the client side—of wireless communications (e.g., LTE communications, Wi-Fi communications, and the like). Thus, communication interface 1192 may include the appropriate equipment and circuitry (perhaps including multiple transceivers) for serving multiple mobile stations, UEs, or other access terminals in a coverage area.

Processor 1194 may include one or more processors of any type deemed suitable by those of skill in the relevant art, some examples including a general-purpose microprocessor and a dedicated DSP. Data storage 1196 may take the form of any non-transitory computer-readable medium or combination of such media, some examples including flash memory, read-only memory (ROM), and random-access memory (RAM) to name but a few, as any one or more types of non-transitory data storage deemed suitable by those of skill in the relevant art could be used. As depicted in FIG. 14, data storage 1196 contains program instructions 1197 executable by processor 1194 for carrying out various combinations of the various network-entity functions described herein.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method comprising:
hosting a shared virtual world in which a plurality of users, including a first user, are able to interact;
while the first user is interacting in the shared virtual world, receiving an instruction from the first user to generate a private copy of a portion of the shared virtual world; and
in response to the instruction, hosting the private copy of the portion of the shared virtual world, wherein only the first user is able to interact in the private copy of the portion of the shared virtual world, wherein the first user alters an object or environment in the private copy;
based at least in part on whether the altered object or environment was altered by another user while the first user was in the private copy, determining whether to apply the alteration to the shared virtual world; and
in response to the first user returning to the shared virtual world, applying the alteration to the shared virtual world according to the determination.

2. The method of claim 1, further comprising receiving from the first user information indicating an extent of the portion of the shared virtual world represented in the private copy.

3. The method of claim 1, wherein the users in the shared virtual world are unable to view interactions of the first user in the private copy of the portion of the shared virtual world.

4. The method of claim 1, wherein, in response to the first user exiting a boundary of the private copy, the first user is automatically returned to the shared virtual world.

5. The method of claim 1, wherein the first user acquires a virtual object during interactions in the private copy, and wherein the first user retains the virtual object after returning to the shared virtual world.

6. The method of claim 1, wherein the first user alters an object or environment in the private copy, and wherein the alteration is applied to the shared virtual world only in response to the first user returning to the shared virtual world.

7. The method of claim 1, wherein the alteration is not applied to the shared virtual world until after a determination is made that the object or environment to be altered is not being observed by other users.

8. The method of claim 1, wherein, in response to a determination that the altered object or environment was not altered by another user while the first user was in the private copy, the alteration by the first user is applied to the shared virtual world.

9. The method of claim 1, wherein, while the first user is interacting in the private copy of the portion of the shared virtual world, other users are able to interact in the portion of the shared virtual world represented by the private copy.

10. An apparatus comprising one or more processors configured to perform at least:
hosting a shared virtual world in which a plurality of users, including a first user, are able to interact;
while the first user is interacting in the shared virtual world, receiving an instruction from the first user to generate a private copy of a portion of the shared virtual world; and
in response to the instruction, hosting the private copy of the portion of the shared virtual world, wherein only the first user is able to interact in the private copy of the portion of the shared virtual world, wherein the first user alters an object or environment in the private copy;
based at least in part on whether the altered object or environment was altered by another user while the first user was in the private copy, determining whether to apply the alteration to the shared virtual world; and
in response to the first user returning to the shared virtual world, applying the alteration to the shared virtual world according to the determination.

11. The apparatus of claim 10, further configured to receive from the first user information indicating an extent of the portion of the shared virtual world represented in the private copy.

12. The apparatus of claim 10, wherein the users in the shared virtual world are unable to view interactions of the first user in the private copy of the portion of the shared virtual world.

13. The apparatus of claim 10, wherein, in response to the first user exiting a boundary of the private copy, the first user is automatically returned to the shared virtual world.

14. The apparatus of claim 10, wherein the first user acquires a virtual object during interactions in the private copy, and wherein the first user retains the virtual object after returning to the shared virtual world.

15. The apparatus of claim 10, wherein the first user alters an object or environment in the private copy, and wherein the alteration is applied to the shared virtual world only in response to the first user returning to the shared virtual world.

16. The apparatus of claim 10, wherein the alteration is not applied to the shared virtual world until after a determination is made that the object or environment to be altered is not being observed by other users.

17. The apparatus of claim 10, wherein, in response to a determination that the altered object or environment was not altered by another user while the first user was in the private copy, the alteration by the first user is applied to the shared virtual world.

18. The apparatus of claim 10, wherein, while the first user is interacting in the private copy of the portion of the shared virtual world, other users are able to interact in the portion of the shared virtual world represented by the private copy.

* * * * *